United States Patent
Schweid

(12) 
(10) Patent No.: US 6,353,687 B1
(45) Date of Patent: Mar. 5, 2002

(54) SYSTEM AND APPARATUS FOR SINGLE SUBPIXEL ELIMINATION WITH LOCAL ERROR COMPENSATION IN AN HIGH ADDRESSABLE ERROR DIFFUSION PROCESS

(75) Inventor: Stuart A. Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/216,324

(22) Filed: Dec. 18, 1998

(51) Int. Cl.[7] ................................................ G06K 9/38
(52) U.S. Cl. ........................................ 382/252; 382/251
(58) Field of Search .............................. 382/252, 251, 382/237; 358/1.9, 534–536, 429, 456–459

(56) References Cited

U.S. PATENT DOCUMENTS

| | | | | |
|---|---|---|---|---|
| 5,226,096 A | * | 7/1993 | Fan | 382/50 |
| 5,394,252 A | * | 2/1995 | Holladay et al. | 358/533 |
| 5,818,971 A | * | 10/1998 | Moolenaar et al. | 382/252 |

FOREIGN PATENT DOCUMENTS

| | | | | |
|---|---|---|---|---|
| EP | 0581561 A2 | * | 2/1994 | H04N/1/40 |
| EP | 0903933 A2 | * | 3/1999 | H04N/1/405 |
| JP | 10093821 | * | 4/1998 | |

* cited by examiner

Primary Examiner—Thomas D. Lee
Assistant Examiner—Stephen Brinich
(74) Attorney, Agent, or Firm—Michael J. Nickerson; David E. Henn

(57) ABSTRACT

A system and method for processing image data converts a pixel of image data having a first resolution to a plurality of subpixels, the plurality of subpixels representing a second resolution, the second resolution being higher than the first resolution. The plurality of subpixels are thresholded to generate a group of subpixel values for each pixel and a threshold error value. It is then determined if the group of subpixel values from the thresholding process produce a pattern containing an isolated subpixel. If the group of subpixel values from the thresholding process produce a pattern containing an isolated subpixel, the group of subpixel vales is modified to produce a pattern without an isolated subpixel. The modification process produces a subpixel error value which is compensated for localized error before being diffused to adjacent pixels.

10 Claims, 32 Drawing Sheets

$$= \frac{P0_i + P1_i}{2} \qquad = \frac{n*255}{N}$$

under the error generated; and modifies the other image data based on the generated error when it is determined that the other image data needs modification.

SYSTEM AND APPARATUS FOR SINGLE SUBPIXEL ELIMINATION WITH LOCAL ERROR COMPENSATION IN AN HIGH ADDRESSABLE ERROR DIFFUSION PROCESS

FIELD OF THE PRESENT INVENTION

The present invention is directed to an error diffusion process which allows for elimination of isolated subpixels before rendering by a printer or printing system. More specifically, the present invention is directed to an error diffusion process for eliminating the creation of isolated subpixels and adjusting the diffused error value so as to compensate for the elimination of the isolated subpixels and localized error.

BACKGROUND OF THE PRESENT INVENTION

Error diffusion is a common technique for converting a grey scale image to a binary image. This process, however, assumes that a printer is an ideal device wherein black pixels and white pixels can be rendered not withstanding their effective size. FIG. 1 shows the block diagram of a conventional error diffusion process.

As illustrated in FIG. 22, input grey video is inputted to an adder 10 wherein slowscan error, which represents error from the processing of the previous scanline of pixels, stored in a FIFO 11 is added to the input grey video. Moreover, fastscan error from an error distribution circuit 15 is also added to the input grey video at adder 10. The fastscan error from the error distribution circuit 15 represents the error from processing the previous pixel in the same scanline. The modified input grey video ($Pix_N$) is then fed to a comparator 14 which compares the modified input grey video with a threshold value. Based on the comparison with the threshold value, the comparator 14 outputs a binary output of either 1 or 0. The modified input grey video is also fed to a subtraction circuit 12 and a multiplexer 14. Subtraction circuit 12 generates a value representative of the difference between a black reference value and the modified input grey video value. This difference is also fed to multiplexer 14. Multiplexer 14 selects either the difference value or the modified input grey video value as the pixel error for the presently processed pixel based on the binary output from comparator 14. This pixel error is fed to the error distribution circuit 15 which utilizes a plurality of weighting coefficients to distribute the error to various adjacent pixels.

However, with the recent improvements in the capabilities of printers, conventional error diffusion cannot be readily used without experiencing artifacts in the rendered image. For example, many printers now use high addressable outputs; two or more binary bits are generated for each grey pixel input. Usually, the multiple bits are created in the fastscan direction (the orientation in which the single scanline is printed).

High addressability is important in situations where the device can process the image data at one resolution, but print at a higher resolution. In such a situation, the present invention can take advantage of a processing system designed for a lower resolution image, (lower resolution can be processed quicker and less expensively), and a printing device which, through laser pulse manipulation, can print at a higher resolution. For example, the image can be processed at 600×600×8 and printed at 2400×600×1 using the high addressability process of the present invention. In the above example, the high addressability characteristic is 4. If the image was processed at 600×600×8 and printed at 1200×600×1, the high addressability characteristic would be 2.

In such a high addressable environment, conventional error diffusion process can generate images that contain many isolated subpixels. An isolated subpixel is a subpixel that is different from both of it's neighbors in the fastscan direction; i.e., a black subpixel surrounded by white subpixels. At first blush this would not seem to be a problem, but xerography is not sensitive enough to effectively print single isolated subpixels, thus resulting in objectionable artifacts being created in the rendered image.

One such artifact that is caused by the inability of a xerographic system to render a subpixel is a grey level shift in the output data. More specifically, the grey level shift is caused because the isolated subpixels that don't print, due to the insensitivity of a xerographic printer, do not add to the light absorption as expected and thus the actual grey level perceived is not equal to the grey level of the original image.

For example, if a grey sweep is printed using a high addressability characteristic that is greater than 1, for example 2, the image should appear as a smooth gradient of grey from grey to light grey to white. However, if such a grey sweep is printed utilizing conventional error diffusion and a high addressability characteristic greater than 1, a discontinuity appears in the image near the darker end. This discontinuity is due to the fact that a certain grey level may produce relatively few isolated subpixels, but the adjacent grey levels may produce many more isolated subpixels. The areas with a large percentage of isolated subpixels appear much lighter since the subpixels do not faithfully reproduce.

Another artifact of the inability to render isolated subpixels is that certain grey levels may have whited out areas. This artifact is caused by many isolated subpixels being printed in a localized area. In other words, since the isolated pixels cannot be effectively rendered by the printer, these isolated pixels become white areas in the generated output document. Thus, a grey area may become completely white if the many isolated subpixels are not properly rendered by the printer.

Thus, the present invention proposes a system which compensates for a printer's inability to render isolated subpixels when using high addressability error diffusion to process the image data, by eliminating the isolated subpixels. The present invention also proposes updating the error propagated in the error diffusion process to account for modifications in the subpixel datastream.

Moreover, the present invention improves the image quality of images processed using subpixel elimination in an error diffusion process. More specifically, the present invention reduces the magnitude of the error signal which is calculated and propagated to pixels in the slow-scan direction after subpixel elimination. In other words, the present invention reduces the variance of the modified error signal but keep overall sum of error unchanged.

SUMMARY OF THE PRESENT INVENTION

One aspect of the present invention is a method for processing image data. The method receives a plurality of pixels of image data; converts the received pixels of image data to a bitmap of image data ready for rendering on an output device; analyzes the bitmap for a predetermined characteristic; modifies the image data within the bitmap when the predetermined characteristic is detected; generates an error based on the modification performed; determines if other image data within the bitmap needs modification based on the generated error; and further modifies the bitmap if other image data within the bitmap needs modification based on the generated error.

A second aspect of the present invention is a system for processing image data. The system includes means for converting received pixels of image data to a bitmap of image data ready for rendering on an output device; comparing means for analyzing the bitmap for a predetermined characteristic; compensation means for modifying the image data within the bitmap when the predetermined characteristic is detected; error means for generating an error based on the modification performed by said compensation means; and local error means for determining if other image data within the bitmap needs modification based on the generated error and for further modifying the bitmap if the other image data within the bitmap needs modification based on the generated error.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
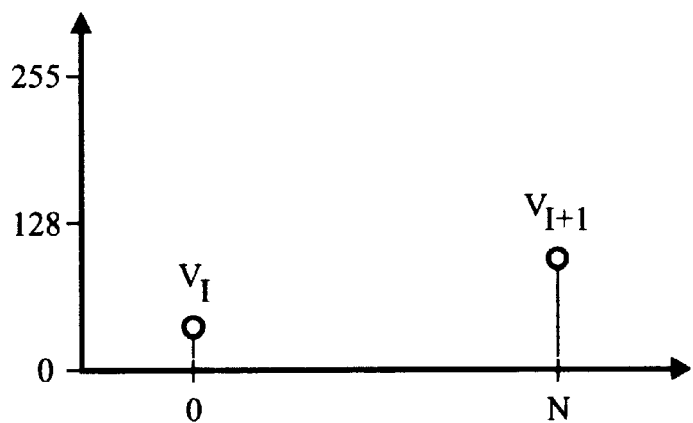
FIG. 1 shows a graphical representation of obtaining boundary subpixel values.
Figure 2:
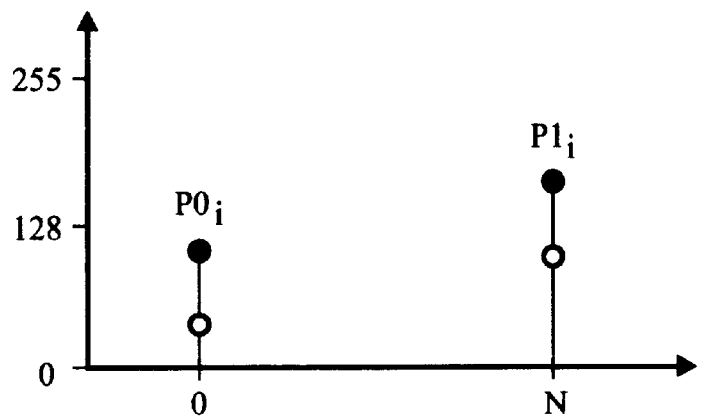
FIG. 2 shows a graphical representation of modifying the obtained boundary subpixel values with an error component.

The following will be a detailed description of the drawings illustrating the present invention. In this description, as well as in the drawings, like references represent like devices, circuits, or circuits performing equivalent functions.

Before discussing the actual concepts of eliminating isolated subpixels and compensating for localized error, high addressable error diffusion will be discussed to provide proper perspective for the present invention.

In describing the present invention, the terms pixel and subpixel will be utilized. These terms may refer to an electrical (or optical, if fiber optics are used) signal which represent the physically measurable optical properties at a physically definable area on a receiving medium. The receiving medium can be any tangible document, photoreceptor, or marking material transfer medium Moreover, the terms pixel and subpixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

As noted above, the error diffusion process of the present invention is a high addressability error diffusion process. To extend the conventional error diffusion process, as described above, to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the high addressability error diffusion process, it is assumed that the input grey levels at pixel location i and pixel location i+1 are represented by $V_i$ and $V_{i+1}$, respectively. It is noted that if the high addressable error diffusion process is a hybrid high addressable error diffusion process the input grey levels to the high addressable error diffusion circuit would be $V_{i}=(G_L-Vin_i)+(S_i-Th)$, and $V_{i+1}=(G_L-Vin_{i+1})+(S_{i+1}-Th)$ where $S_i$ is equal to screen values derived from a halftone screen pattern, $Vin_i$ is the grey input video, $G_L$ is a maximum grey level value for a pixel in the system, and Th is the threshold value used in the binarization process. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

With respect to a first interpolation scheme, the steps for determining the printing or rendering of a subpixel are as follows.

Initially, the modified pixel values $P0_i=V_{i-1}+e_{i-1}$ and $P1_i=V_i+e_i$ are computed. The subpixels are denoted by 0 to N−1 wherein the high addressability characteristic is N. The high addressability characteristics is the number of subpixels that a printer can produce compared to the throughput bandwidth of the image processing system. In other words, the high addressability characteristic defined as the number of subpixels that the image output terminal can render from one pixel of image data.

The interpolated subpixel values are computed as $B_n=P0+n(P1-P0)/N$ for n=0 to N−1. The interpolated subpixel values are then compared with a threshold value which in most cases is 128, assuming that the video value ranges from 0 to 255. If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N, wherein y is the number of subpixels turned ON. The error is then multiplied by a set of weighting coefficients and distributed to the downstream pixels as in the first version.

Any set of coefficients can be used. In the preferred embodiment of the present invention, the weighting coefficients are the coefficients described in U.S. Pat. No. 5,353,127. The entire contents of U.S. Pat. No. 5,353,127 are hereby incorporated by reference.

More specifically, the screened inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

Figure 23:
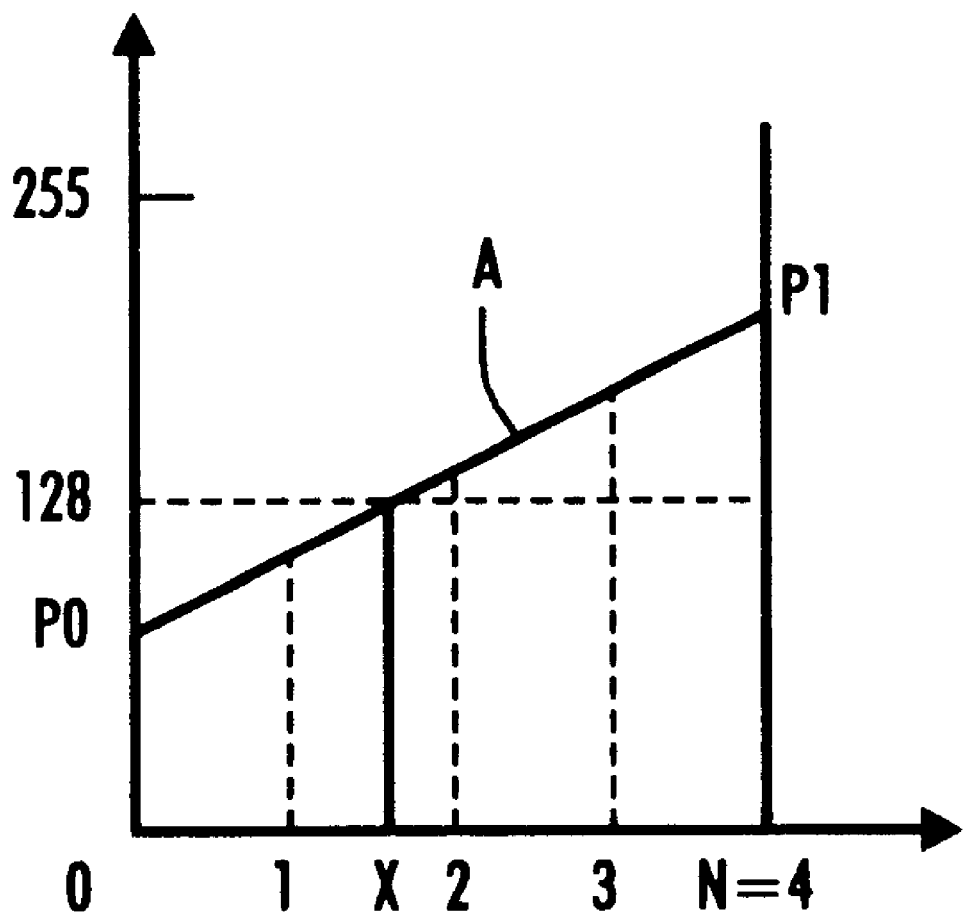
FIG. 23 shows a graph illustrating subpixel interpolation.

As noted above, the modified pixel values $P0_i=V_{i-1}+e_{i-1}=P1_{i-1}$ and $P1_i=V_i+e_i$ are computed at two locations corresponding to the input resolution. An example of this is illustrated in FIG. 23 wherein the subpixels are denoted by 0 to N−1. In FIG. 23, the high addressability characteristic, N, is equal to 4.

As illustrated in FIG. 23, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized and any threshold value may be used.) The intersection of the line connecting P0 and P1 and the line representing the threshold at 128 determines which subpixels are to be rendered or printed. The X coordinate of the point of intersection is determined and normalized to N by the equation X=N (128−P0)/(P1−P0).

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 23, that the value of X does not necessarily compute to a whole number or subpixel, thereby making any analysis include a fractional component. To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than N, and if P1 is less than 128, only the subpixels from 0 to n are turned ON and the rest of the subpixels are turned OFF; otherwise, the subpixels from 0 to n are turned OFF and the rest are turned ON. If X is greater than or equal to N and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, (P0+P1)/2, and the actual output, namely b*255/N where b is the number of subpixels that were turned ON. The converted error is then multiplied by a set of weighting coefficients and distributed to the downstream pixels.

Figure 24:
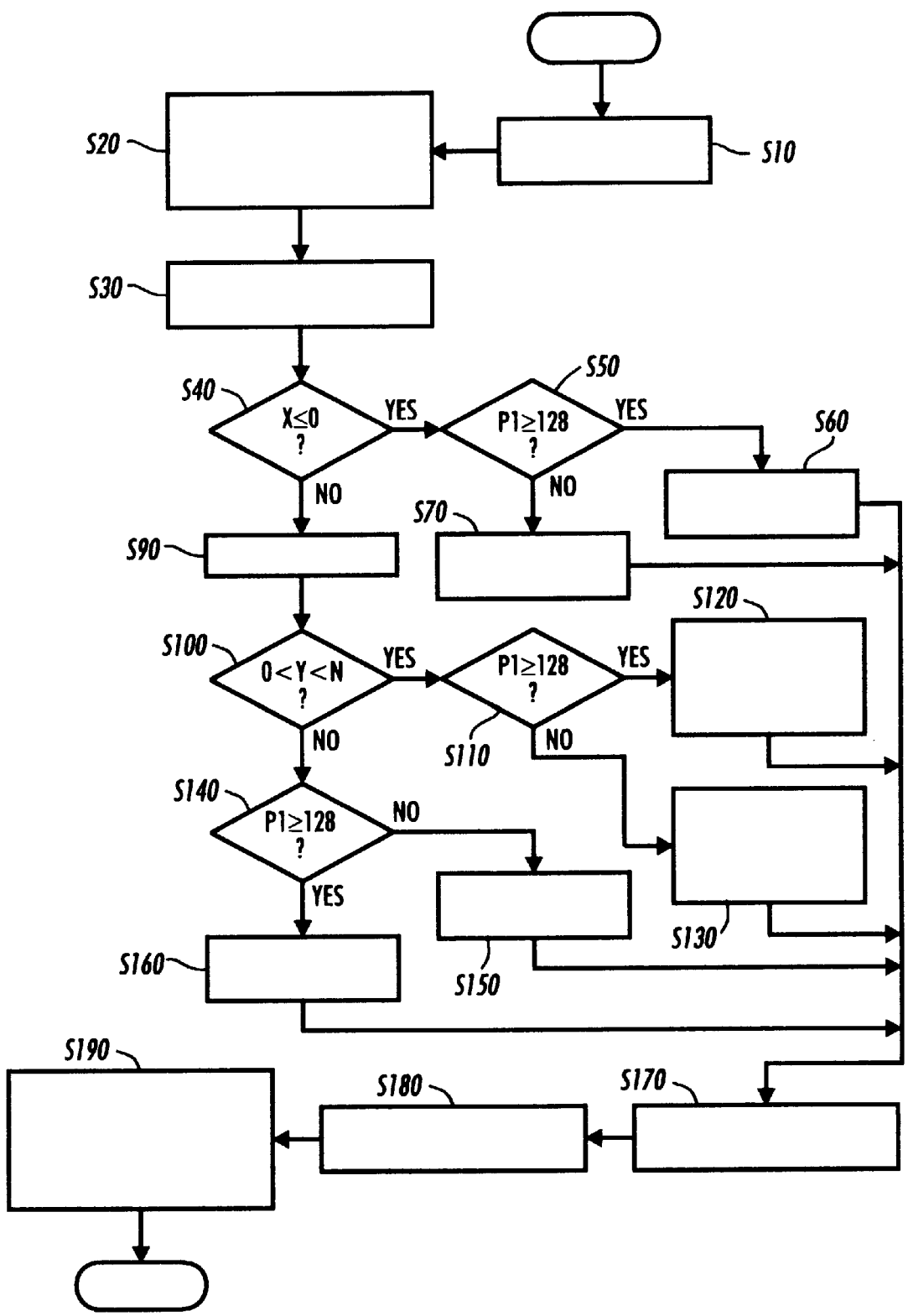
FIG. 24 shows a flowchart illustrating an error diffusion method using the interpolation schemes of FIG. 23.

FIG. 24 illustrates the actual method utilized to carry out the interpolation and error distribution process described above. In FIG. 24, at Step S10, the modified screened video input signal is divided into N subpixel values. At Step S20, the values $P0_i$ and $P1_i$ are calculated as described above. Next, at Step S30, the X-coordinate of the point of intersection is determined and normalized by multiplying the difference between 128 and P0 by the value N and dividing this product by the difference of P1 and P0. At Step S40, the normalized value X is compared with the value 0. If X is less than or equal to 0, Step S50 compares the value P1 with the value 128. If the value P1 is greater than or equal to 128, all the subpixels are set to an ON state at Step S60. However, if P1 is less than 128, Step S70 sets all the subpixels to an OFF state.

On the other hand, if Step S40 determines that X is not less than or equal to 0, Step S90 determines the integer value of X and sets this integer value equal to Y. At Step S100, the integer value Y is compared with the values 0 and N. If the value Y lies between 0 and N, Step S110 determines whether the value P1 is less than or equal to 128. If the value P1 is less than or equal to 128, Step S120 sets the subpixels 0 to Y to the ON state and the subpixels Y+1 to N to the OFF state. However, if Step S110 determines that the value P1 is greater than 128, Step S130 sets the subpixels 0 to Y to the OFF state and the subpixels Y+1 to N to the ON state.

If Step S100 determines that the value Y is not between the values 0 and N, Steps S140 determines whether the value P1 is greater than or equal to 128. If the value P1 is greater than or equal to 128, Step S160 sets all subpixels to the ON state. However, if Step S140 determines that the value P1 is less than 128, Step S150 sets all the subpixels to the OFF state.

Upon completing the processes at either Steps S60, S70, S120, S130, S150, or S160, the error diffusion method of the present invention proceeds to Step S170. At Step S170, the number of ON subpixels is calculated and set equal to Z. Next, at Step S180, the error to be propagated to the downstream pixels is calculated. Namely, the error is calculated to represent the original low spatial resolution. Upon calculating the error in Step S180, Step S190 multiplies the error by weighting coefficients and distributes the weighted error terms to downstream pixels.

The second interpolation method with respect to implementing the high addressability error diffusion method of the present invention will be describe as follows.

Figure 25:
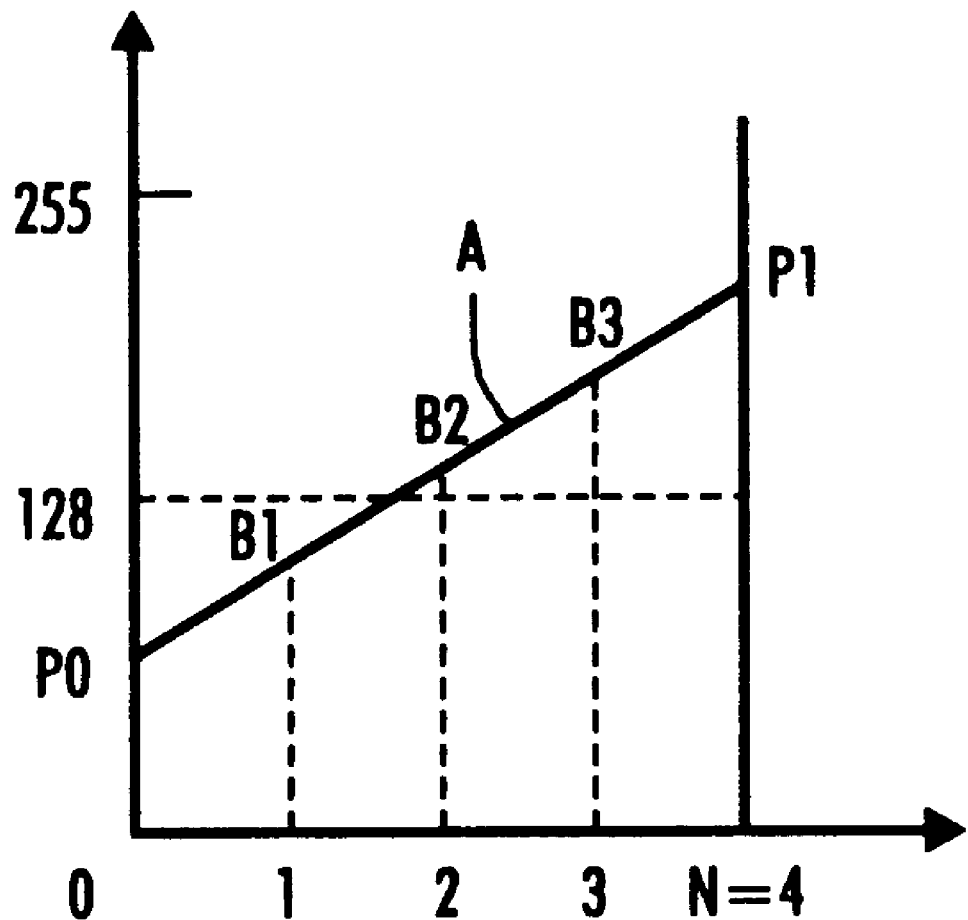
FIG. 25 shows a graph illustrating another subpixel interpolation method.

In the second interpolation method, the modified pixel values are $P0_i=V_i+e_i$ and $P1_i=V_{i+1}+e_i$. FIG. 25 illustrates the values P0 and P1 for the second version of the high addressability error diffusion method of the present invention.

Figure 26:
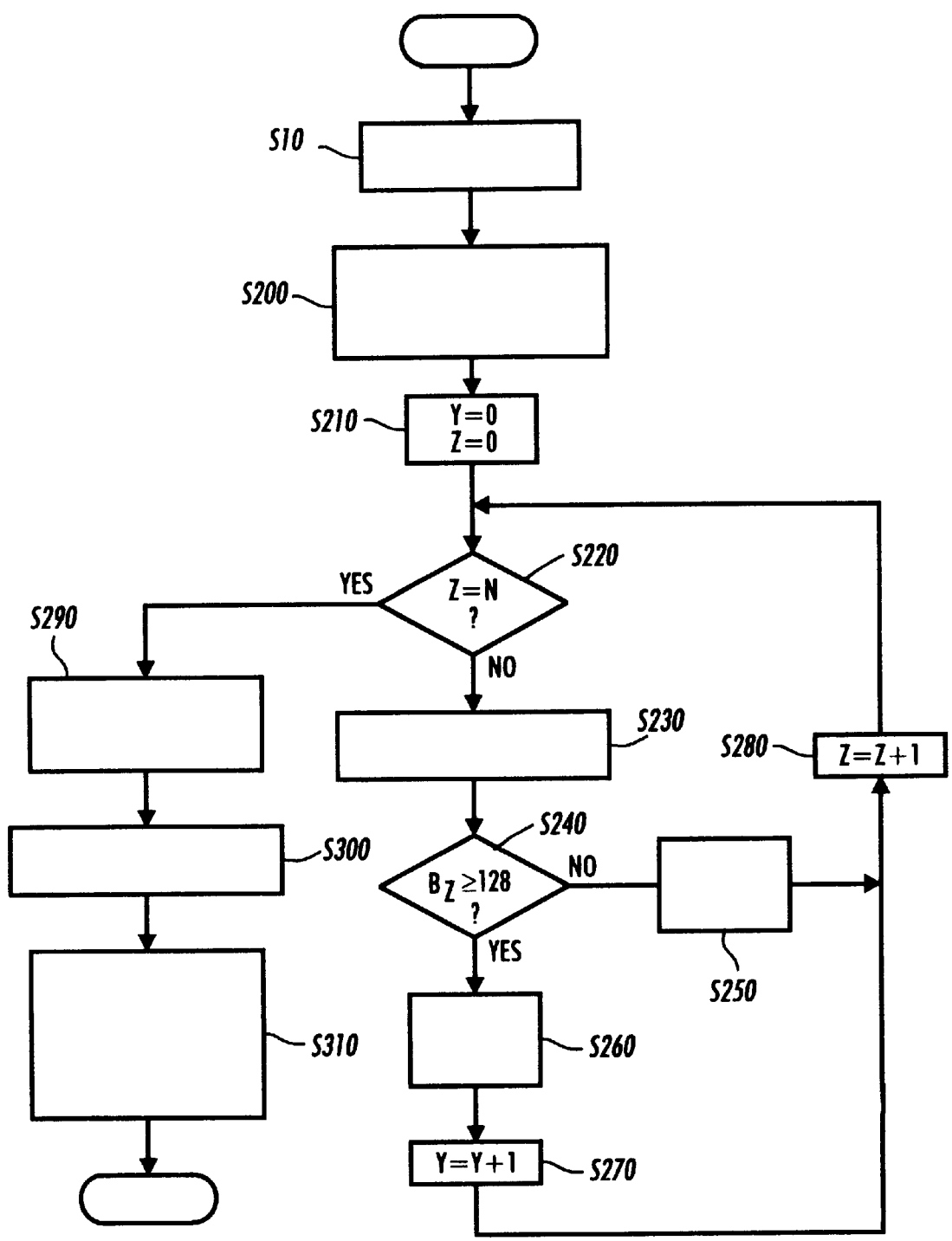
FIG. 26 shows a flowchart illustrating an error diffusion method using the interpolation scheme of FIG. 25.

FIG. 26 illustrates the process utilized in the second interpolation version of the high addressability error diffusion method of the present invention. As in the FIG. 26, the input modified video signal is divided into N subpixel units at Step S10. At Step S200, the P0 and P1 values are computed as noted above. At Step S210, the values Y and Z are set equal 0, wherein Y denotes the number of subpixels which are to be turned ON and Z denotes the addressability factor. At Step S220, Z is compared with N to determined whether all the subpixels within the modified video signal have been thresholded. If it is determined that subpixels remain to be thresholded, the process moves to Step S230 wherein the next subpixel value is computed. Step S240 then compares the computed subpixel value with the threshold value, namely 128. If the subpixel value is greater than or equal to the threshold value, Step S260 sets the subpixel value to the ON state, and Step S270 increments the value Y indicating the number of subpixels that are set ON. However, if the subpixel value is less than 128, Step S250 sets the subpixel value to OFF.

Upon the completion of either Step S250 or Step 270, the process proceeds to Step S280 wherein the high addressability value Z is incremented. This subroutine is repeated until all subpixel values within the modified video signal are compared with the threshold value. Upon completing the comparison of all subpixel values, the process advances to Step S290 wherein the number of ON subpixels are calculated. At Step S300, the error from the threshold process is calculated so that the value represents the original lower spatial resolution. Upon calculating the error, Step S310 multiplies the error by weighting coefficients and distributes the error to downstream pixels.

To determine the ON or OFF characteristics of the subpixels as described above, the subpixel values are processed by a number of comparison steps. An example of the actual architecture of the circuitry used to implement the high addressability error diffusion process will be discussed below.

FIGS. 1–7 illustrate the computational steps required to perform high addressability error diffusion using a particular interpolation scheme. Initially, as illustrated in FIG. 1, the pixel value $V_i$ and $V_{i+1}$ are obtained. The actual pixel values are graphically illustrated in FIG. 1, wherein the pixel value $V_i$ represents the pixel value at the subpixel position 0 and the pixel value $V_{i+1}$ represents the pixel value at the N subpixel. In FIG. 1, the pixel values range from 0 to 255 utilizing a conventional eight-bit dataword to represent the multi-level grey value of the image data to be process. It is noted that any range can be utilized to represent the grey level value of the image data; for example, 0 to 511, 0 to 127, etc.

After obtaining the initial pixel values of $V_i$ and $V_{i+1}$, a diffused error component $e_i$ (the accumulated error from previous pixel binarization processes) is added to the pixel values $V_i$ and $V_{i+1}$. It is noted that the error component $e_i$ consists of two components, $e_{FIFO}$ and $e_{FB}$, where $e_{FIFO}$ is the summed error component stored in a line buffer and $e_{FB}$ is the feedback error component. The adding of the error component $e_i$ is illustrated graphically in FIG. 2.

Figure 3:
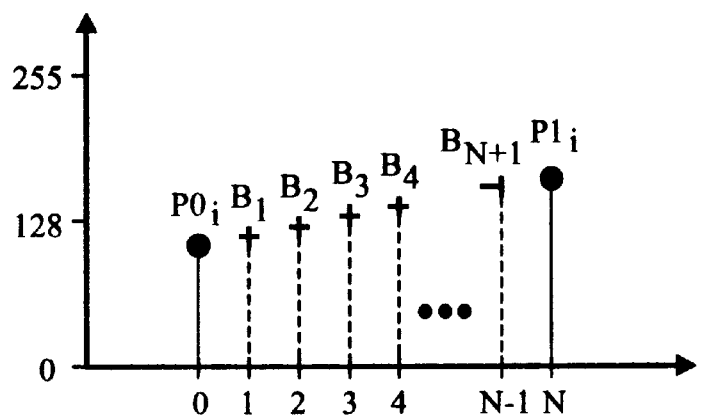
FIG. 3 shows a graphical representation of interpolating subpixel values between the modified boundary subpixel values.

After adding the diffused error component, the interpolated subpixel values are computed, as illustrated in FIG. 3. For example, the interpolated subpixel values are $B_n=P0_i+n(P1_i-P0_i)/N$ for n=0 to N−1, where N is the selected high addressability characteristic. It is noted that the value $P0_i$ is equal to $V_i+e_i$ and $P1_i$ is equal to $V_{i+1}+e_i$.

After computing the interpolated subpixel values, each interpolated subpixel value is compared to a threshold level.

Figure 4:
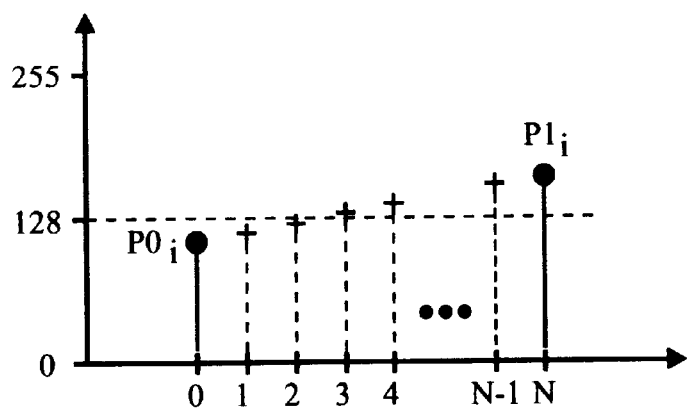
FIG. 4 shows a graphical representation of comparing the interpolated subpixel values with a threshold value.
Figure 5:
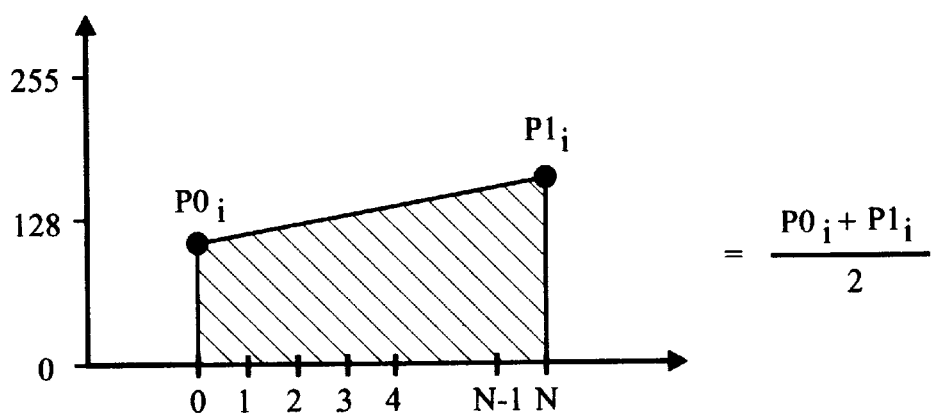
FIG. 5 shows a graphical representation of computing a desired output value.

In the example illustrated in FIG. 4, the threshold value is 128. It is noted that this threshold value can be any value within the range of the image data depending upon the desired results. In this example, each subpixel which has a value greater than or equal to 128 is set ON.

Figure 6:
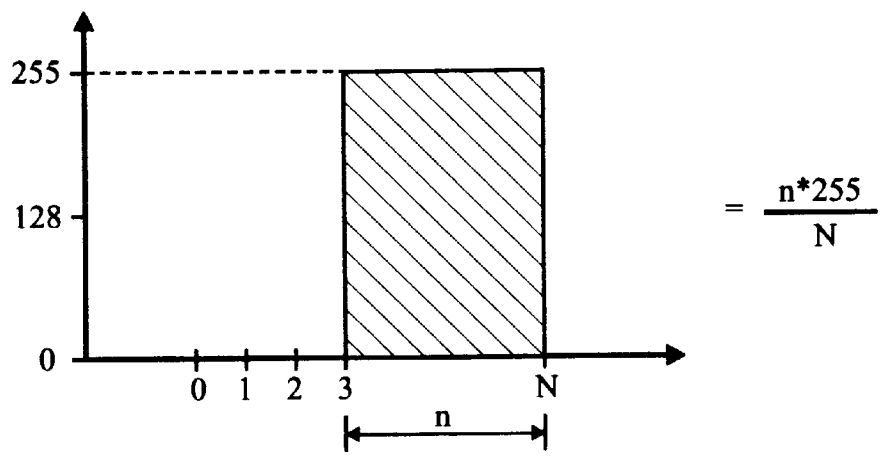
FIG. 6 shows a graphical representation of computing an actual output value.

Next, the desired output $(P0_i+P1_i)/2$ is computed. This computing of the desired output is graphically illustrated in FIG. 5. After computing the desired output, the actual output is computed. In this example, the actual output is equal to $n*255/N$ where n is the number of subpixels that have been turned ON as the result of the comparison illustrated in FIG. 10. A graphical representation of the computed actual output is shown in FIG. 6. Once the desired output and the actual output have been computed, the error diffusion method computes the error to be propagated downstream. This error is computed as the desired output minus the actual output. A graphical representation of this computation is shown in FIG. 7.

Figures 7, 8:
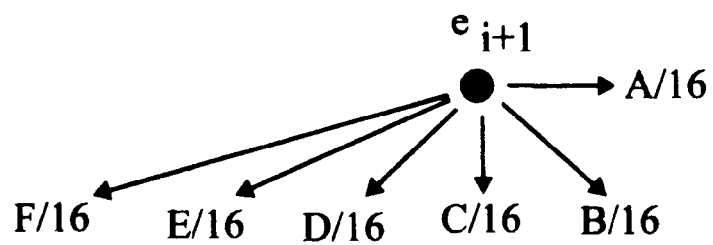
FIG. 7 shows a graphical representation of computing an error value to be propagated to downstream pixels.
FIG. 8 shows a graphical representation illustrating actual distribution of the error in a typical error distribution routine.

As illustrated in FIG. 7, the error is calculated to be $e_{i+1}=(P0_i+P1_i)/2-(n*255/N)$. In this instance, the error $e_{i+1}$ represents the error from the present binarization process. As in all conventional error diffusion processes, the error from the binarization process is distributed to downstream pixels. The distributing of the error $e_{i+1}$ to downstream pixels is illustrated in FIG. 8. In this example, the distribution of error utilizes a set of error diffusion coefficients which allow fast processing by simple bit shifting. FIG. 8 illustrates the diffusion scheme associated with each pixel location.

Figure 9:
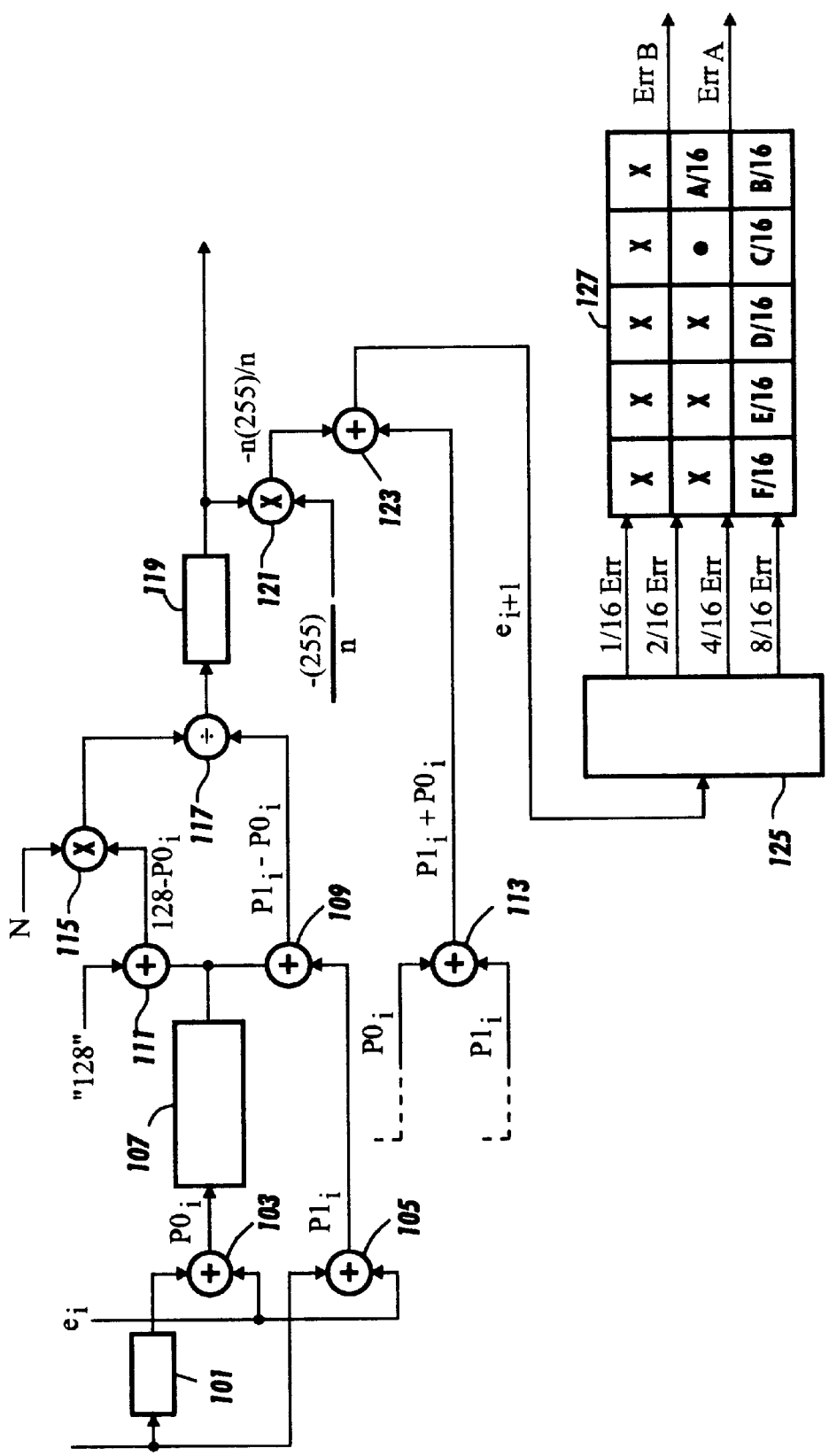
FIG. 9 shows a block diagram illustrating an example for implementing a high addressability error diffusion process.

In FIG. 9, the screened input video signal is split and latched in latch 101 so as to produce the screened pixel values $V0_i$ and $V1_i$. $V0_i$ represents the latched screened input video signal $V1_i$ as noted above, and $V0_i$ represents the screened pixel value just proceeding the screened pixel value $V1_i$ in the same scanline. The screened pixel value $V0_i$ is fed into an adder 103 with the error component $e_i$. Moreover, the error component $e_i$ is fed into an adder 105 along with the screened input video signal $V1_i$. The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value $(128-P0_i)$ can be multiplied by the high addressability characteristic value N. The resulting product is then divided by the sum from adder 109 by a divider circuit 117. The resulting quotient is fed into a decoder 119. The actual function of decoder 119 is graphically illustrated in FIG. 10.

Figure 10:
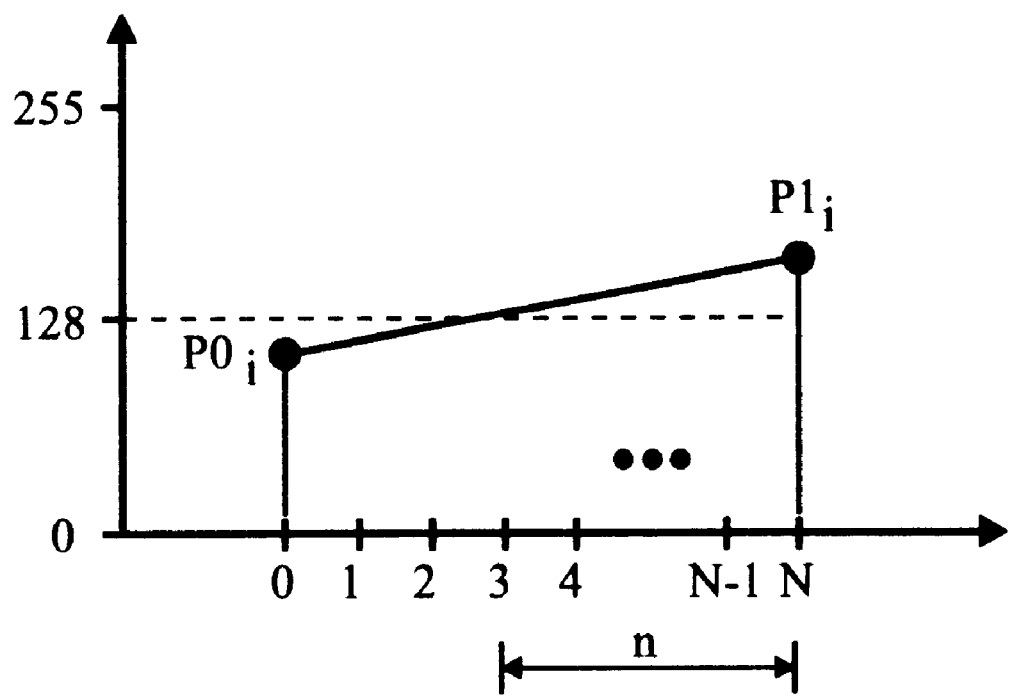
FIG. 10 shows a graphical representation illustrating a decoding process illustrated in FIG. 9.

More specifically, the decoder 119, as illustrated in FIG. 10, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value $(-255/N)$. The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_B$ is distributed to the next pixel in the same scanline and the other half of the error $Err_A$ is distributed to various pixels in the next scanline according to the weighting coefficients established in the error distribution circuit 127.

Figure 11:
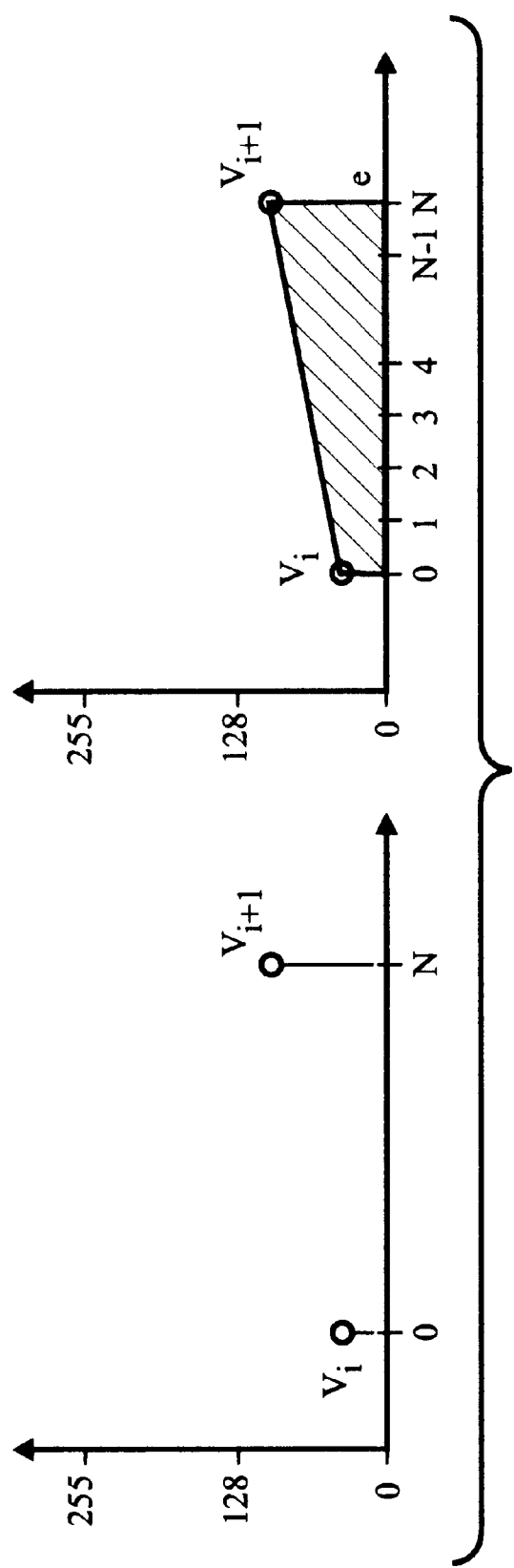
FIG. 11 shows a graphical representation illustrating the obtaining boundary subpixel values in parallel with the computing a desired output value.

FIG. 11 illustrates two parallel computations which are carried out in the present invention. More specifically, FIG. 11 illustrates that the screened pixel values $V_i$ and $V_{Vi+1}$ are obtained in parallel to the beginning of the computation of the desired output for a single subpixel wherein the desired output is computed without including the diffused error components $e_{FIFO}$ or $e_{FB}$.

Figure 12:
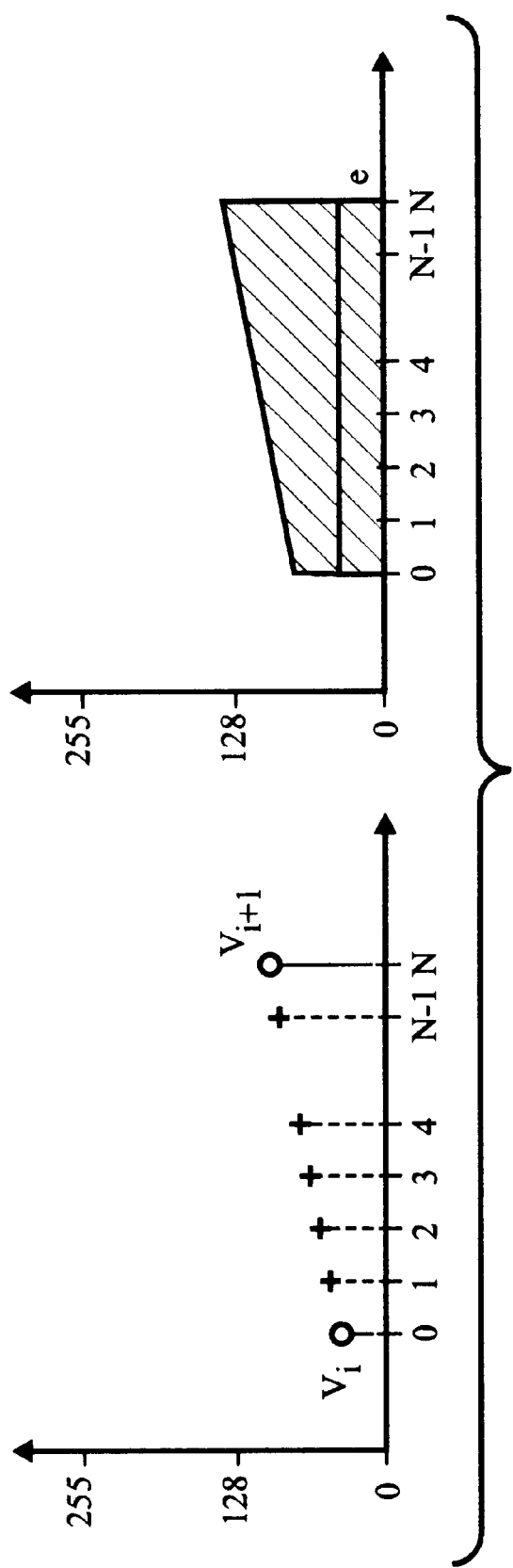
FIG. 12 shows a graphical representation illustrating the interpolating of subpixel values between the obtained boundary subpixel values in parallel with the modifying of the desired output value with an error component.

After these parallel computations are completed, the preferred embodiment of the present invention computes interpolated subpixel values in the same way as illustrated in FIG. 3. However, in parallel with this computation of the interpolated subpixel values, the desired output is continued to be computed by adding the error component $e_{FIFO}$. This is graphically represented in FIG. 12.

Figure 13:
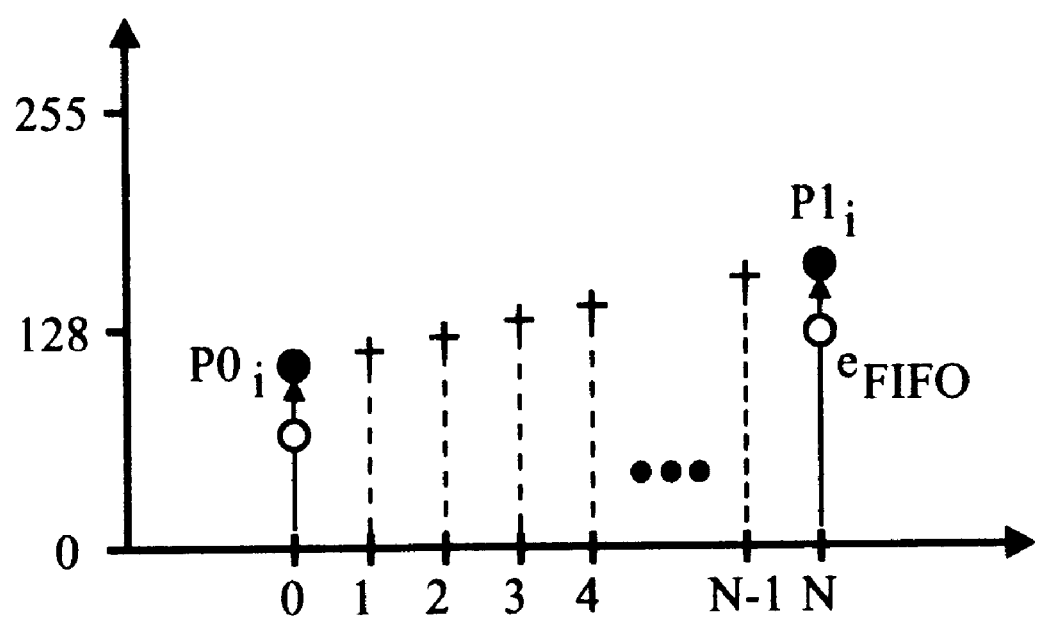
FIG. 13 shows a graphical representation illustrating the modifying of the subpixel values between the obtained boundary subpixel values with an error component.
Figure 14:
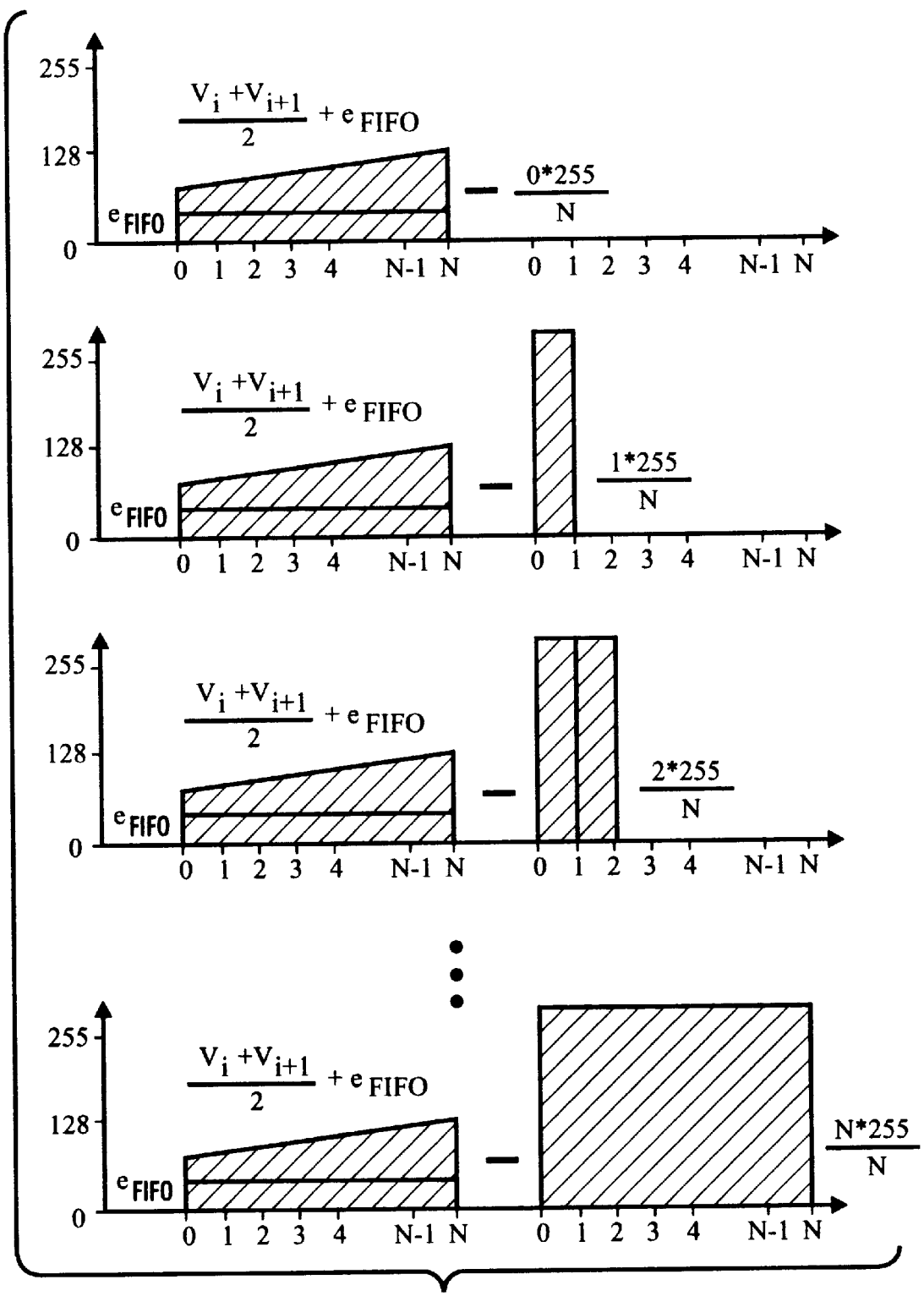
FIG. 14 shows a graphical representation illustrating the calculation of a plurality of partial possible error values.

Next, the error component $e_{FIFO}$ is added to the screened pixel values $V_i$, and $V_{i+1}$ and the interpolated subpixels as illustrated in FIG. 13. At the same time (in parallel thereto), all possible actual subpixel outputs are subtracted from the desired output without including the diffused error component $e_{FB}$. In other words, N possible actual subpixel outputs are subtracted from the desired output computed in FIG. 12 to produce N possible error outputs $e_p$ (the desired output minus the actual output is equal to the error $e_p$). The computations illustrated in FIG. 13 are carried out in parallel with the computations illustrated in FIG. 14.

Figure 15:
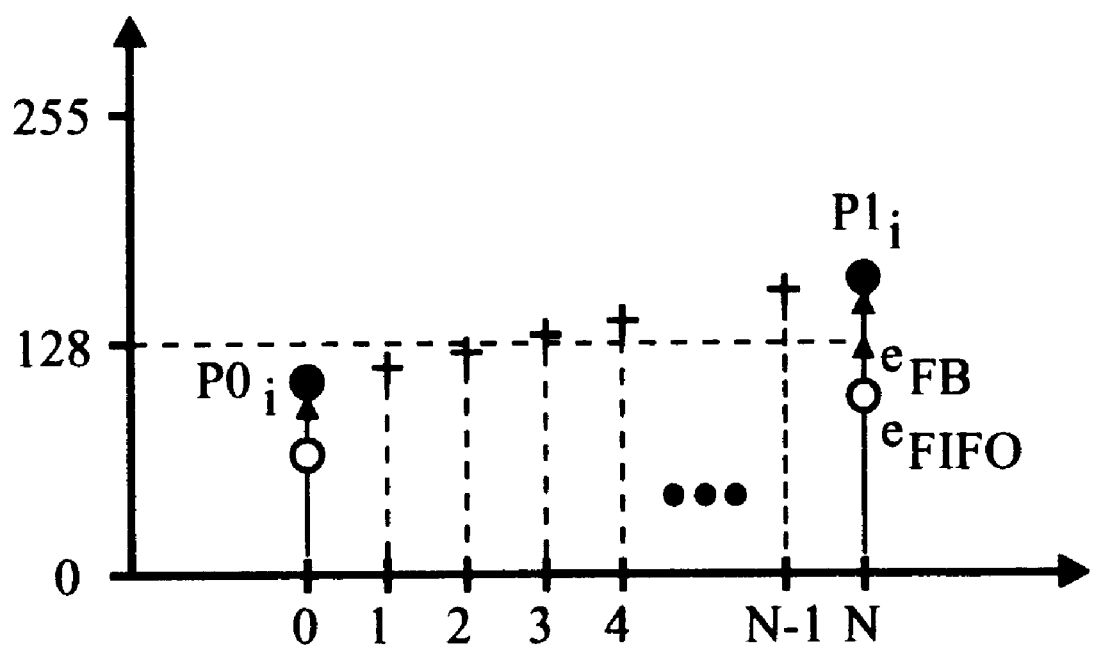
FIG. 15 shows a graphical representation of further modifying the modified subpixel values of FIG. 11 with another error component.
Figure 16:
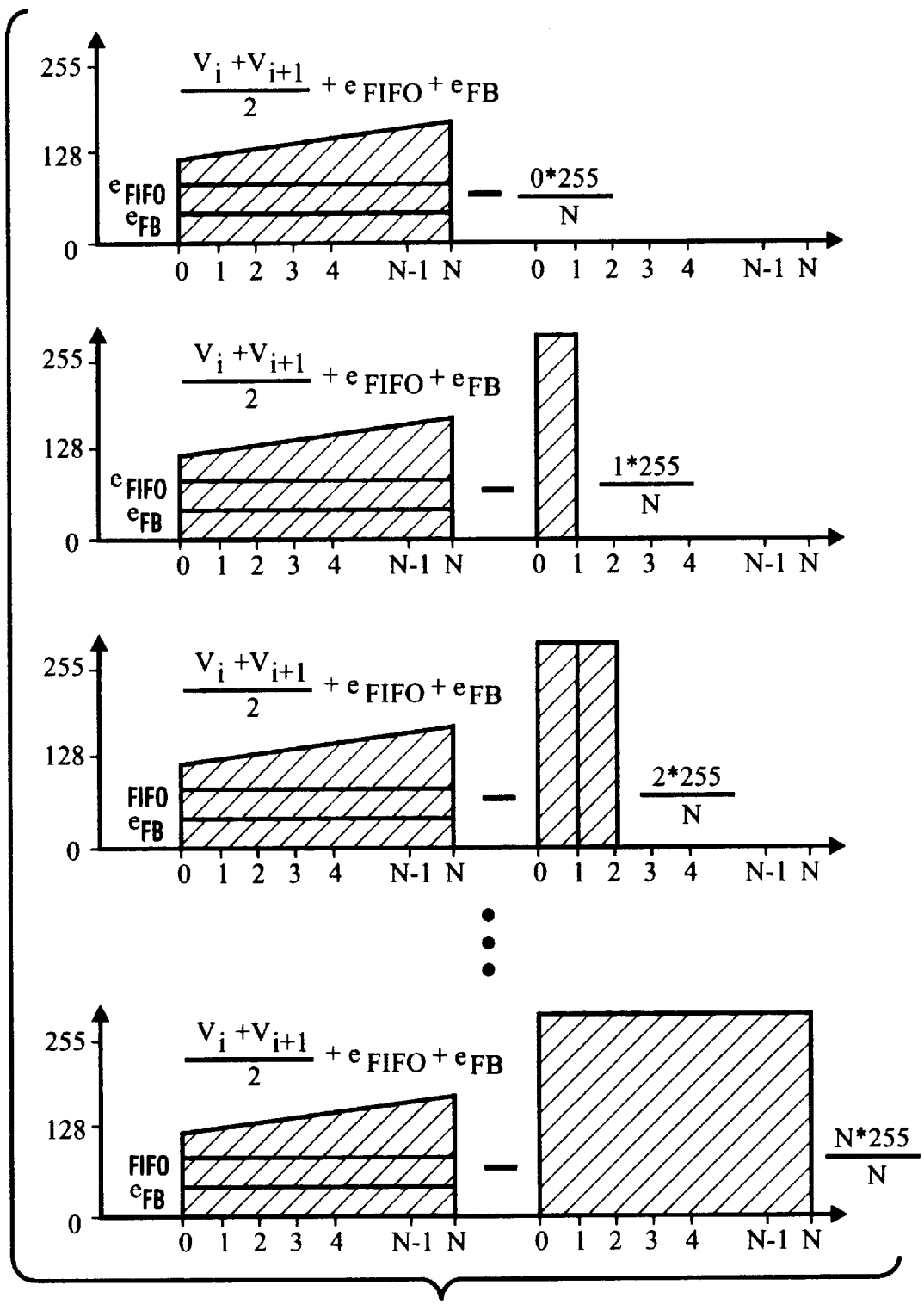
FIG. 16 shows a graphical representation illustrating the calculation of a plurality of complete possible error values.

The error component $e_{FB}$ is added to the screened pixel values $V_i$, $V_{i+1}$, and the various interpolated subpixel values as illustrated in FIG. 15. At the same time that the feedback error component $e_{FB}$ is being added in FIG. 15, the error component $e_{FB}$ is added to all possible subpixel desired outputs as illustrated in FIG. 16. In other words, the error component $e_{FB}$ is individually added to all N error results $(e_p)$ stemming from the calculations illustrated by FIG. 14.

Figure 17:
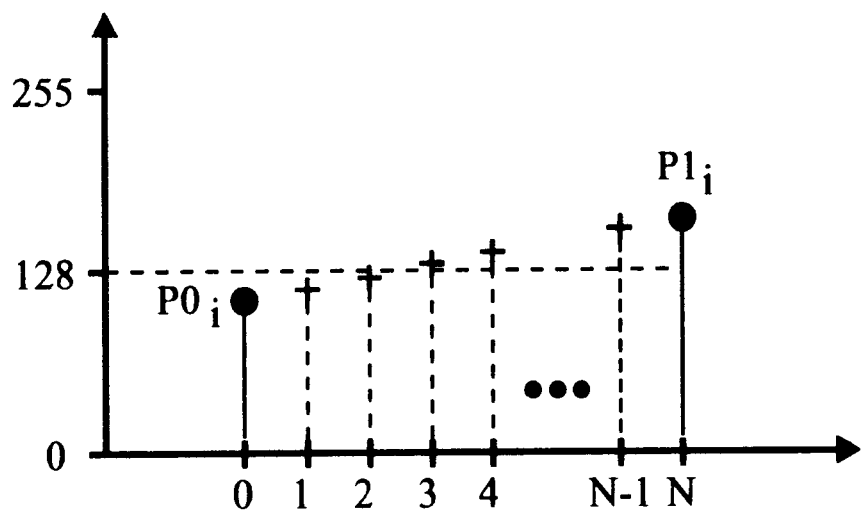
FIG. 17 shows a graphical representation of thresholding the further modified subpixel values.
Figure 18:
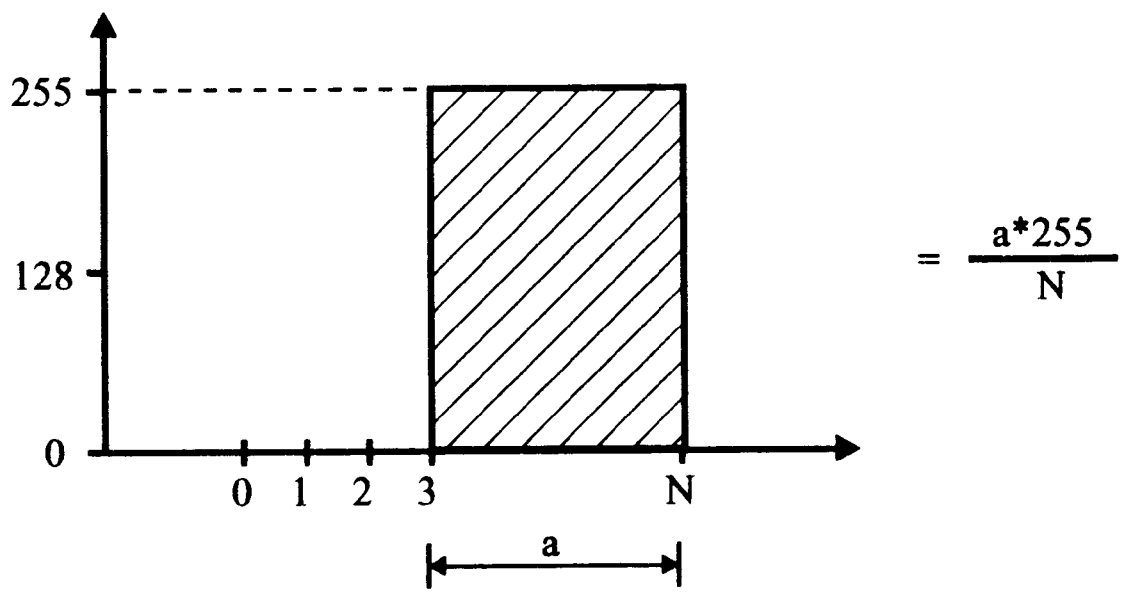
FIG. 18 shows a graphical representation of determining of number of subpixels exceeding or equal to a threshold value.
Figure 19:
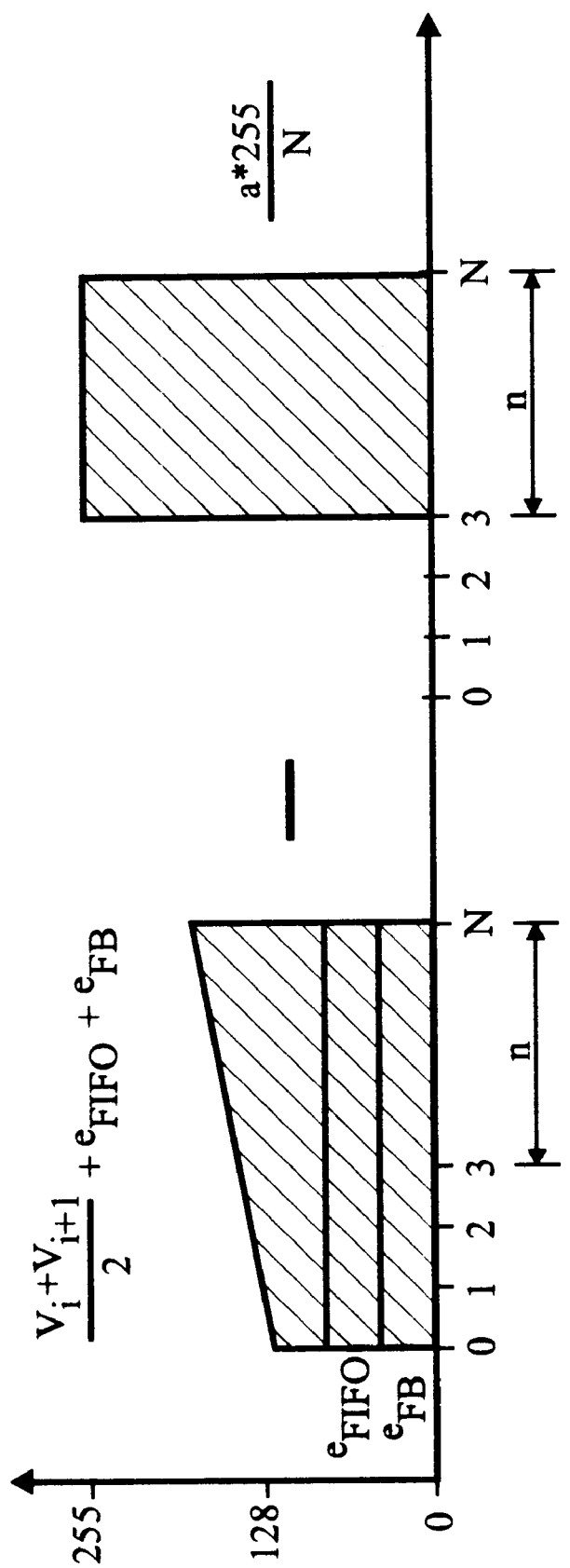
FIG. 19 shows a graphical representation of selecting one of the plurality of possible complete error values.

After completing these parallel computations, the next step includes the computations illustrated in FIGS. 17, 18, and 19. In this next step, each interpolated subpixel value is compared to a threshold value of 128, and the subpixels having a value greater than or equal to the threshold value are turned ON. This process is graphically illustrated in FIG. 17 and 18 wherein FIG. 17 shows the comparison of the interpolated subpixel values with the threshold values, and FIG. 18 shows the turning ON of the subpixels which have a value greater than or equal to the threshold value.

Since all the possible error values were made simultaneously available as a result of the computations illustrated in FIG. 16, the error to be propagated downstream can now be immediately selected; i.e., via a multiplexer, based upon the number of subpixels which are turned ON. In other words, FIG. 19 illustrates the properly selected error value from the various simultaneously available error values produced by the computations illustrated in FIG. 16. The selected error value is then distributed to downstream pixels utilizing any conventional error diffusion technique. In the preferred embodiment of the present invention, the error is distributed to downstream pixels utilizing the error diffusion coefficients discussed above.

Figure 20:
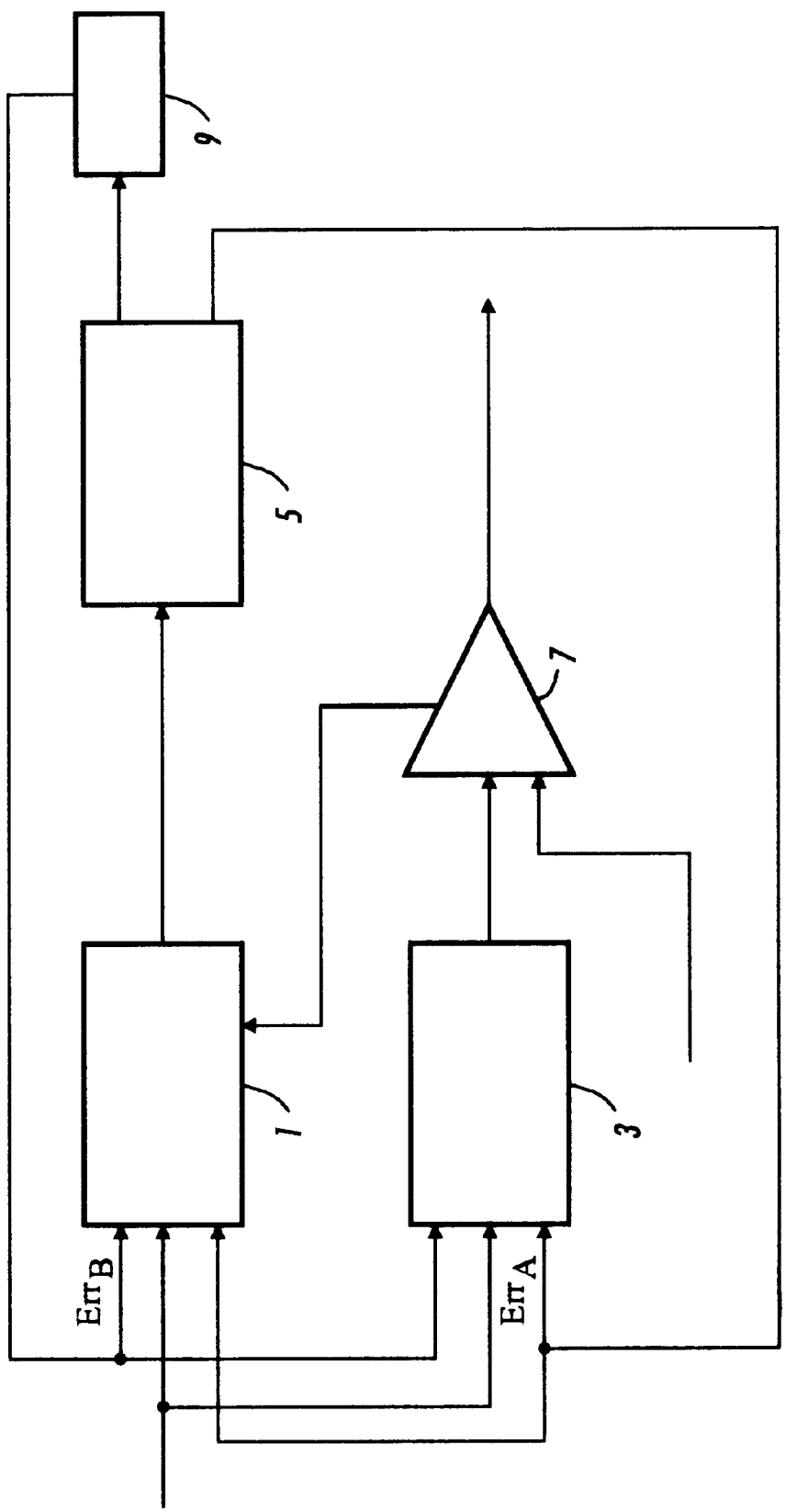
FIG. 20 is a block diagram illustrating implementation of the processes illustrated in FIGS. 11–19.

FIG. 20 illustrates a functional block diagram of a parallel pipeline high addressability error diffusion circuit. In FIG. 20, the input video signal is fed into an error calculation circuit 1 and a video modification circuit 3. The error components $e_{FIFO}$ ($Err_B$) and $e_{FB}$ ($Err_A$) are also fed into the error calculation circuit 1. The error calculation circuit calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection. As illustrated in FIG. 20, the error calculation circuit 1 is in parallel with the video modification circuit 3 and the binarization circuit 7.

Figure 21:
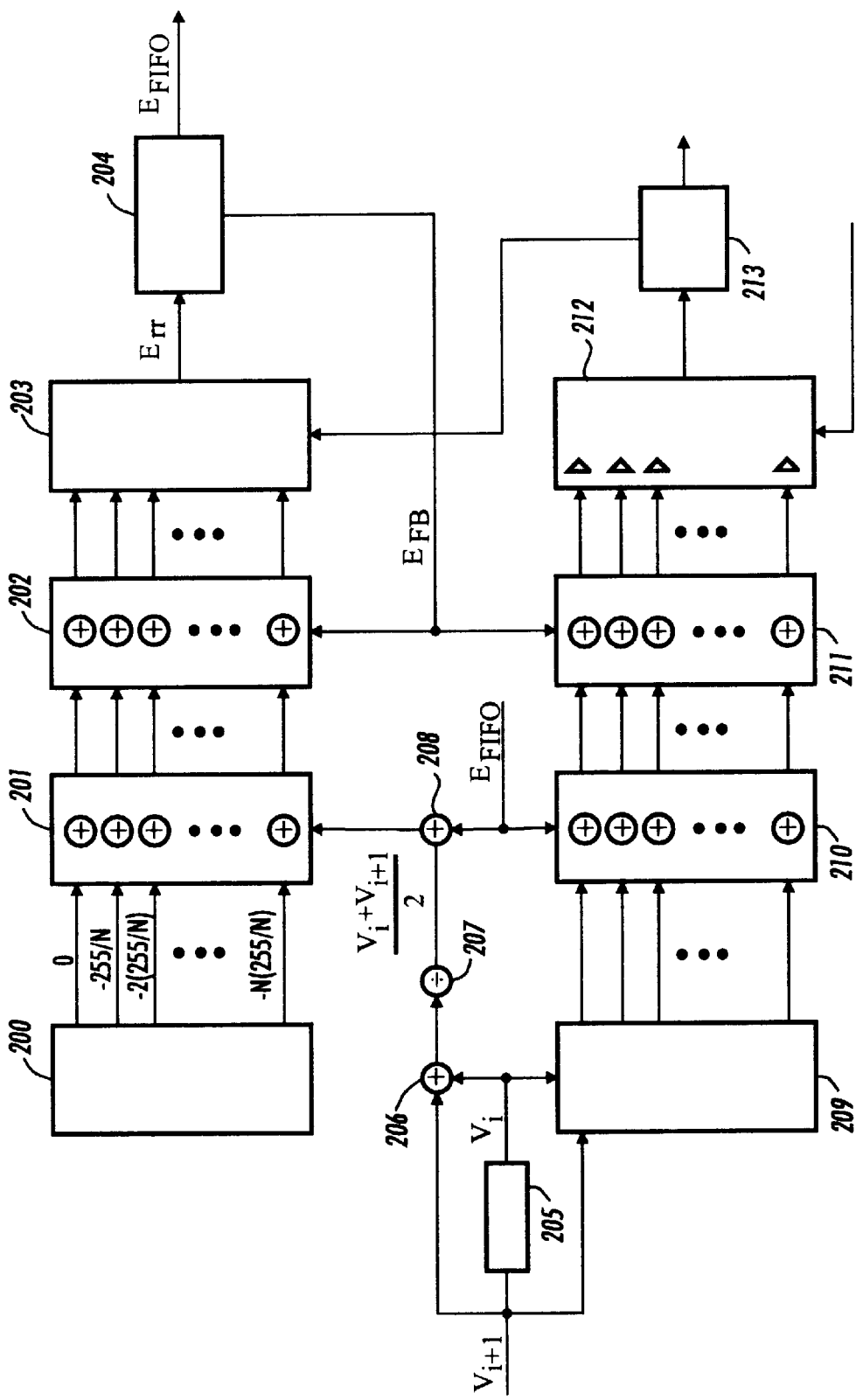
FIG. 21 is a block diagram illustrating circuitry implementation of the processes illustrated in FIGS. 11–19.
Figure 22:
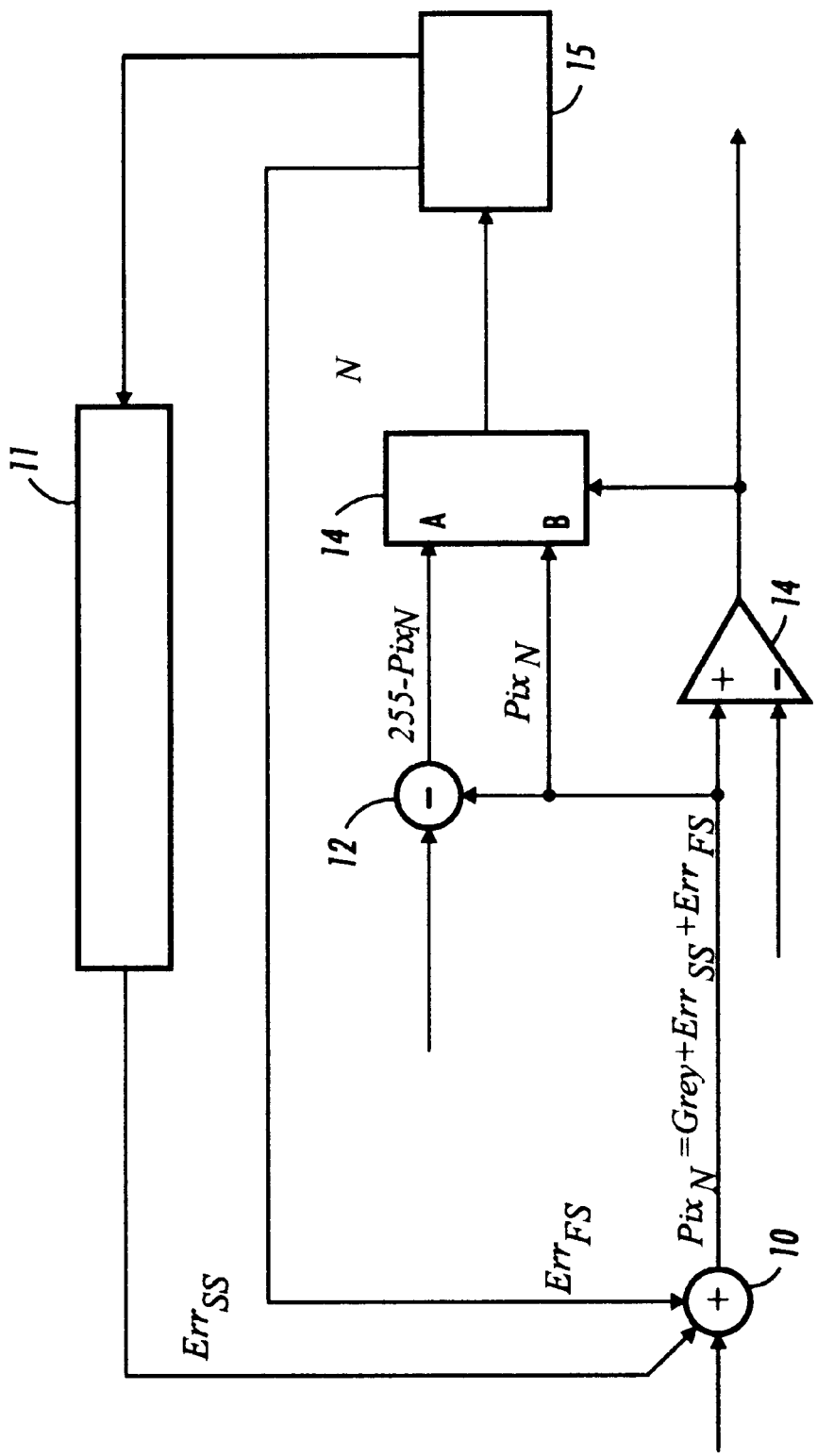
FIG. 22 shows a block diagram illustrating a typical error diffusion method.

FIG. 21 illustrates a detail block diagram of the circuit of another embodiment of high addressable error diffusion. As illustrated in FIG. 21, many of the computations, as previously described with respect to FIGS. 11–19 are carried out in parallel.

Pixel values $V_i$ and $V_{i+1}$ are obtained by the utilization of a latch 205 which latches the video signal so that two adjacent fastscan pixels are available for processing. The pixel values $V_i$ and $V_{Vi+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N possible actual outputs will be generated. Also in parallel to the above described process, a subpixel circuit generated all the interpolated subpixels based on the pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to downstream pixels. The error term is selected based on a control signal received from the decode logic circuit 213. The selected error term is fed into a distribution circuit 204 which produces the next feedback error and the error to be stored in a buffer for utilization in the processing of the next scanline.

As noted above, these high addressable error diffusion circuits can generate isolated subpixels which might not be renderable by the attached printing system. Thus, the present invention proposes two approaches to eliminate the passing on of isolated subpixels to the printing system The first approach is to place constraints on the error diffusion process by disallowing certain states that would generate an isolated subpixel. The disallowed states are determined from the bit output pattern of the previous pixel.

An example of this approach will be discussed using a system with two high addressable bits in the fastscan direction. In this system, for every location, two output bits are generated per input pixel. Lets assume that the previous pixel had the output bit pattern of "01". The present invention would then designate the bit output patterns of "00" and "01" as disallowed states for the present pixel since the concatenated (previous state and present state patterns combined) pattern "0100" and "0101" would contain an isolated subpixel (the second bit from the left for both concatenated patterns).

Although this approach is valid in many systems where realtime is not a criteria, such as image systems that use software error diffusion or systems where the pixel rate is not very high, in a system which may process more than 50 million pixels per second, the ability to check for disallowed states cannot be incorporated into a realtime implementation. Thus, the second approach of the present invention utilizes a post error diffusion process that checks and corrects for the creation of single isolated subpixels by manipulating the incoming bit stream and modifying the error generated by the error diffusion process. This process operates on the output stream generated by the error diffusion process.

In the preferred embodiment of the present invention, the manipulation of the incoming bit stream is realized through the utilization of a morphologic filter implemented as a state machine. The state machine uses the error diffused subpixel pattern for an input pixel and the error diffused subpixel pattern for the present state to output a corrected subpixel pattern output and the next state pattern. Such a state machine is illustrated in FIG. 27.

Figure 27:
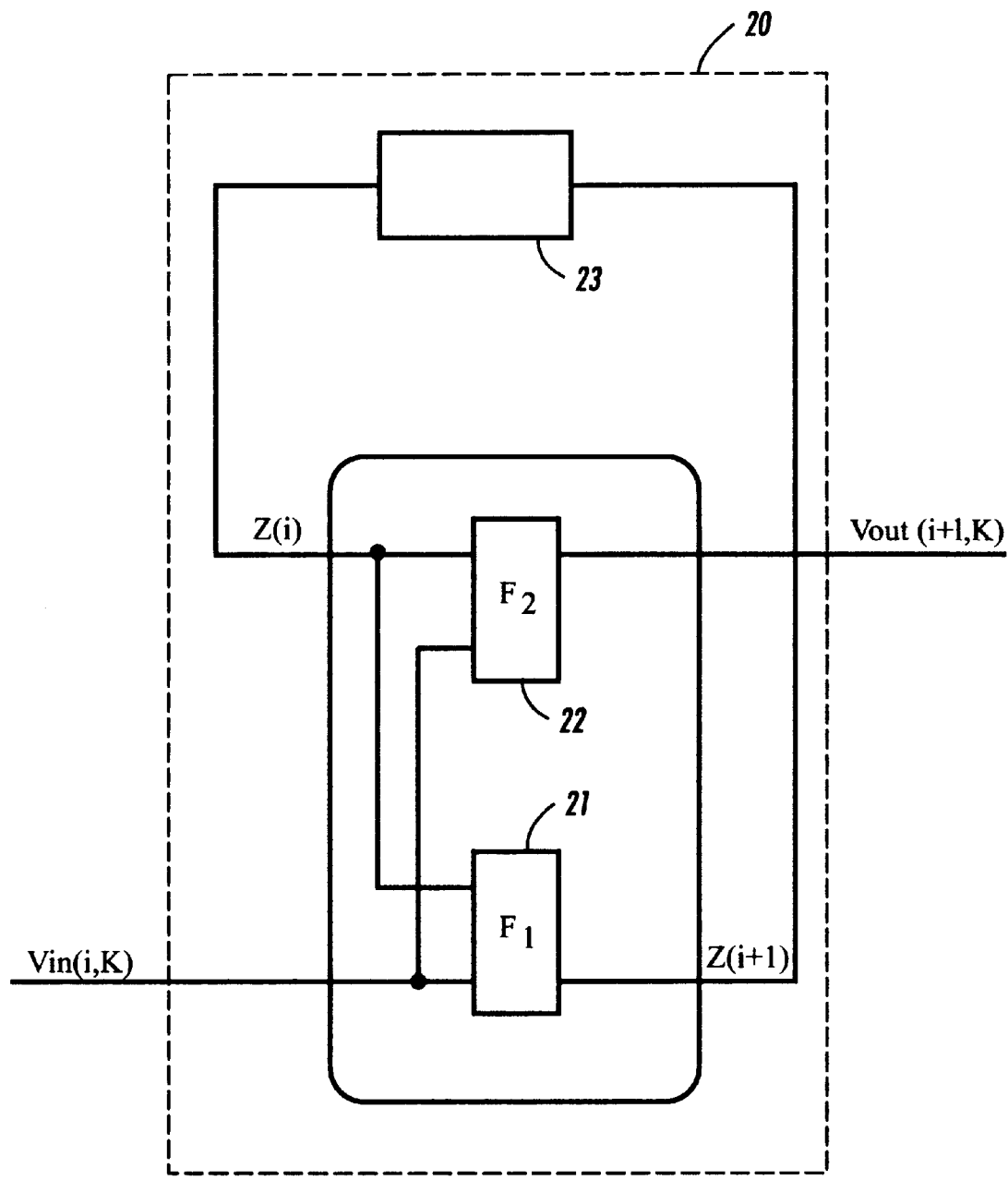
FIG. 27 show a block diagram of a state machine morphological filter for eliminating isolated subpixels.

As illustrated in FIG. 27, the error diffused subpixel pattern of the present state is fed to logic circuits 21 and 22 which also receive the error diffused subpixel pattern for a given pixel from delay unit 23. Logic circuit 22 outputs the corrected subpixel pattern based on the present state bit pattern and the error diffused bit pattern for the input pixel. On the other hand, logic circuit 21 outputs the next state subpixel pattern based on the present state bit pattern and the error diffused bit pattern for the input pixel. In the preferred embodiment of the present invention, logic circuits 21 and 22 generates the output patterns according to Tables 1 and 2, respectively, as illustrated below. Table 3 below illustrates the overall filtering aspect of the state machine illustrated in FIG. 27. The Tables below illustrate examples for a printing system having a high addressability characteristic of 2.

TABLE 1

| PRESENT STATE BIT PATTERN Z(i) | INPUT PIXEL BIT PATTERN Vin(i,k) | NEXT STATE BIT PATTERN Z(i + 1) |
|---|---|---|
| 00 | 00 | 00 |
| 00 | 01 | 01 |
| 00 | 10 | 01 |
| 00 | 11 | 11 |
| 01 | 00 | 00 |
| 01 | 01 | 11 |
| 01 | 10 | 10 |
| 01 | 11 | 11 |
| 10 | 00 | 00 |
| 10 | 01 | 01 |
| 10 | 10 | 00 |
| 10 | 11 | 11 |
| 11 | 00 | 00 |
| 11 | 01 | 10 |
| 11 | 10 | 10 |
| 11 | 11 | 11 |

TABLE 2

| PRESENT STATE BIT PATTERN Z(i) | INPUT PIXEL BIT PATTERN Vin(i,k) | OUTPUT BIT PATTERN Vout(i + 1,k) |
|---|---|---|
| 00 | 00 | 00 |
| 00 | 01 | 00 |
| 00 | 10 | 00 |
| 00 | 11 | 00 |
| 01 | 00 | 00 |
| 01 | 01 | 00 |
| 01 | 10 | 01 |
| 01 | 11 | 01 |
| 10 | 00 | 10 |
| 10 | 01 | 10 |
| 10 | 10 | 11 |
| 10 | 11 | 11 |
| 11 | 00 | 11 |
| 11 | 01 | 11 |
| 11 | 10 | 11 |
| 11 | 11 | 11 |

TABLE 3

| PRESENT STATE BIT PATTERN Z(i) | INPUT PIXEL BIT PATTERN Vin(i,k) | OUTPUT BIT PATTERN Vout(i + 1,k) | NEXT STATE BIT PATTERN Z(i + 1) |
|---|---|---|---|
| 00 | 00 | 00 | 00 |
| 00 | 01 | 00 | 01 |
| 00 | 10 | 00 | 01 |
| 00 | 11 | 00 | 11 |
| 01 | 00 | 00 | 00 |
| 01 | 01 | 00 | 11 |
| 01 | 10 | 01 | 10 |
| 01 | 11 | 01 | 11 |
| 10 | 00 | 10 | 00 |
| 10 | 01 | 10 | 01 |
| 10 | 10 | 11 | 00 |
| 10 | 11 | 11 | 11 |
| 11 | 00 | 11 | 00 |
| 11 | 01 | 11 | 10 |
| 11 | 10 | 11 | 10 |
| 11 | 11 | 11 | 11 |

One way to view filter 20 of FIG. 27 is to consider the state Z(i) as an intermediate output. It is what the next output, $V_{out}$ (i+1), will become if the concatenated pixel pattern ($V_{in}$(i,k) Z(i)) does not contain any isolated subpixels. More specifically, if there are no isolated subpixels detected in the error diffusion stream, the output remains unchanged from the input. No correction is made to bit patterns that do not have any isolated subpixels.

If there is a single subpixel detected in the concatenated pixel pattern C (i,k), either the next output pixel or the next intermediate state is changed in order to eliminate the isolated subpixel. It is noted that if the intermediate state changes, the change is then rippled to all future inputs since the state machine filter in a feedback loop. It is therefore advantageous, when possible, to eliminate the single subpixel by altering the output state because this tends to localize all changes in the output pattern.

Figure 31:
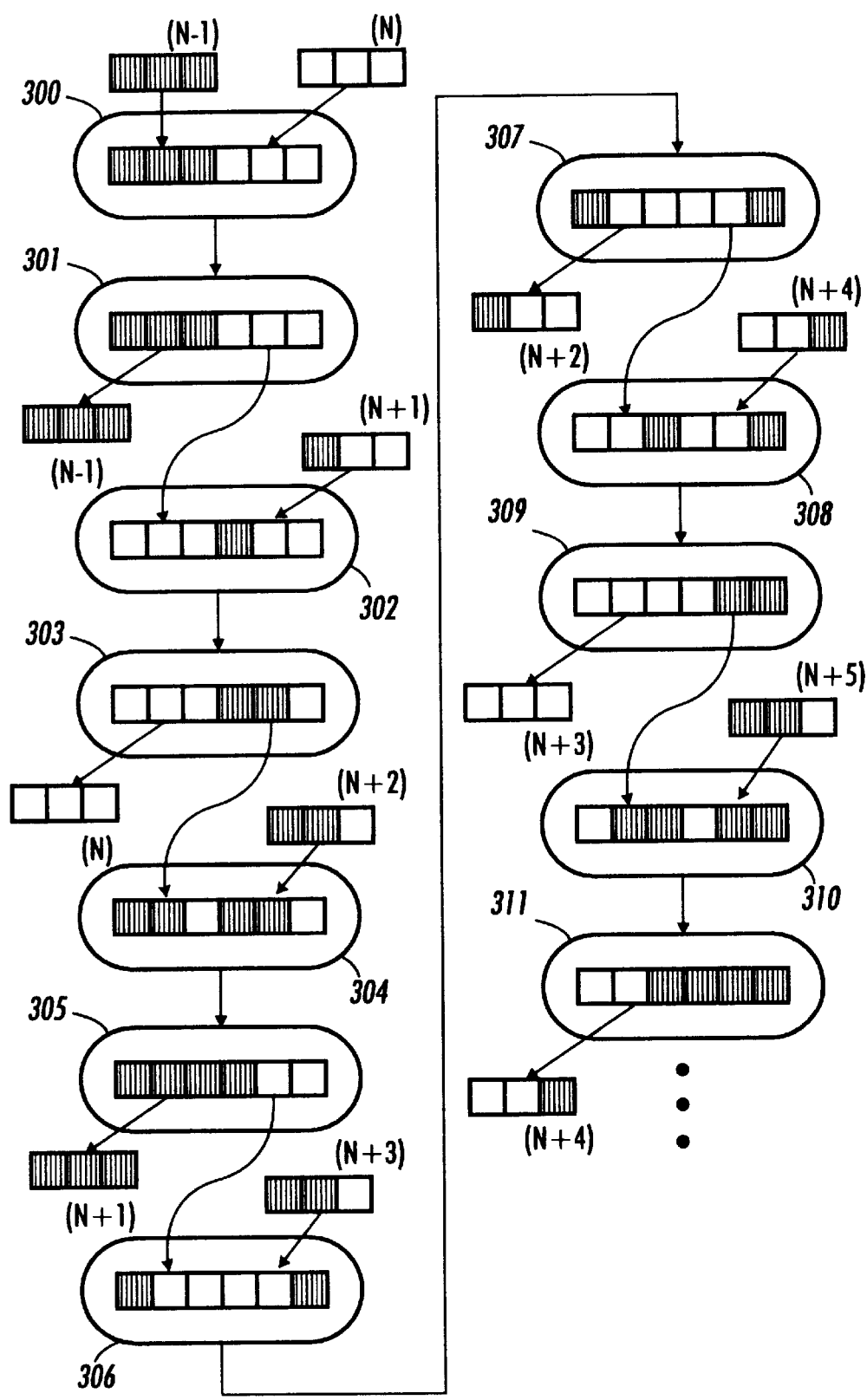
FIG. 31 shows an example of subpixel elimination for a situation when the high addressability characteristic is three.

An example of this isolated subpixel elimination process is illustrated in FIG. 31. The example illustrated in FIG. 31 for a situation wherein the high addressability characteristic is three; i.e., three subpixels of image data are generated per original pixel of image data. Moreover, each horizontal oval in FIG. 31 represents a point in time for processing a pixel of image data.

As illustrated in FIG. 31, In oval 300, the three subpixel bit pattern (111) for $Pixel_{(N-1)}$ is compared with the three subpixel bit pattern (000) for $Pixel_{(N)}$. From this comparison, at oval 301, a subpixel elimination circuit outputs a subpixel bit pattern (111) corresponding to $Pixel_{(N-1)}$ and shifts (stores) the subpixel bit pattern (000) corresponding to $Pixel_{(N)}$ so as to be available for the next comparison. At oval 302, the subpixel bit pattern (100) for $Pixel_{(N+1)}$ is received and compared with the subpixel bit pattern (000) for $Pixel_{(N)}$. Thereafter, at oval 303, the subpixel elimination circuit outputs a subpixel bit pattern (000) corresponding to $Pixel_{(N)}$, changes the subpixel bit pattern for $Pixel_{(N+1)}$ to (110) to eliminate the isolated subpixel (the first subpixel in the bit pattern for $Pixel_{(N+1)}$), and shifts (stores) the new subpixel bit pattern (110) corresponding to $Pixel_{(N+1)}$ so as to be available for the next comparison.

In oval 304, the new subpixel bit pattern (110) for $Pixel_{(N+1)}$ is compared with the received subpixel bit pattern (110) for $Pixel_{(N+2)}$. From this comparison, at oval 305, the subpixel elimination circuit outputs a new subpixel bit pattern (111) corresponding to $Pixel_{(N+1)}$, changes the subpixel bit pattern for $Pixel_{(N+2)}$ to (100) to eliminate the isolated subpixel (the last subpixel in the bit pattern for $Pixel_{(N+1)}$), and shifts (stores) the new subpixel bit pattern (100) corresponding to $Pixel_{(N+2)}$ so as to be available for the next comparison. At oval 306, the subpixel bit pattern (001) for $Pixel_{(N+3)}$ is received and compared with the subpixel bit pattern (100) for $Pixel_{(N+2)}$. Thereafter, at oval 307, the subpixel elimination circuit outputs a subpixel bit pattern (100) corresponding to $Pixel_{(N+2)}$ and shifts (stores) the subpixel bit pattern (001) corresponding to $Pixel_{(N+3)}$ so as to be available for the next comparison.

In oval 308, the subpixel bit pattern (001) for $Pixel_{(N+3}$ is compared with the received subpixel bit pattern (001) for $Pixel_{(N+4)}$. From this comparison, at oval 309, the subpixel elimination circuit outputs a new subpixel bit pattern (000) corresponding to $Pixel_{(N+3)}$, changes the subpixel bit pattern for $Pixel_{(N+4)}$ to (011) to eliminate the isolated subpixel (the last subpixel in the bit pattern for $Pixel_{(N+3)}$), and shifts (stores) the new subpixel bit pattern (011) corresponding to $Pixel_{(N+4)}$ so as to be available for the next comparison. At oval 310, the subpixel bit pattern (011) for $Pixel_{(N+5)}$ is received and compared with the subpixel bit pattern (011) for $Pixel_{(N+4)}$. Thereafter, at oval 311, the subpixel elimination circuit outputs a new subpixel bit pattern (001) corresponding to $Pixel_{(N+4)}$, changes the subpixel bit pattern for Pixel$_{(N+5)}$ to (111) to eliminate the isolated subpixel (the first subpixel in the bit pattern for Pixel$_{(N+5)}$), and shifts (stores) the subpixel bit pattern (111) corresponding to Pixel$_{(N+5)}$ so as to be available for the next comparison. This process is continued until all pixels (subpixel bit patterns) are processed.

The second part of the present invention deals with altering the error being diffused in the slowscan direction to account for changes made in the output bit pattern. This assures that the overall number of black and white subpixels is not altered by the subpixel manipulation process.

As stated previously, there is not enough time in many printing systems to alter the error diffusion process to incorporate the inclusion of disallowed states. In addition, there is not enough time to modify the error propagated in the fastscan direction as this has already been used by the time the pixel output pattern has been modified. However, the error being past to future scanlines (error being diffused in the slowscan direction) can be varied as this is not needed until a time much later. This passing of the error to pixels in the slowscan direction is where information regarding subpixel manipulation can be accounted for in the future processing of pixel information.

As discussed above, in a typical error diffusion process, an input grey level and an output pixel pattern are used to determine the error propagated to future pixels as per a set of weighting coefficients. Similarly, the error difference between the error diffused produced bit pattern and the output bit pattern after the subpixel manipulation is used by the present invention to propagate an error to pixels in the slowscan direction.

As an example of this process, assume that a white subpixel has a numeric value of $W_S$ and a black subpixel has a numeric value of $B_S$. Therefore, if a single pixel is comprised of N white subpixels and M–N black subpixels where M is a number of high addressable bit, the single pixel has a numeric value of $(M*B_S+N*(W_S-B_S))$. If due to the manipulation described above, this pattern is changed to N+K white pixels and M–N–K black subpixels, the single pixel will have a new numeric value of $(M*B_S+(N+K)*(W_S-B_S))$. This change in the numeric value of the single pixel is equal to $K*(W_S-B_S)$. Similar to conventional error diffusion, the error that is generated is equal to the numeric difference between the input and output bit pattern. In the present invention, the error that is generated is equal to subpixel error=$K*(B_S-W_S)$ wherein K is the number of subpixels in the single pixel that are changed from black to white.

This error can be passed down to the next scanline or the pixels in the slowscan direction using any combination of weights that sum to unity. In the preferred embodiment of the present invention, the error diffusion process for the isolated subpixel elimination process uses the same set of slowscan coefficient weights that already being implemented by the high addressable error diffusion process. If these coefficient weights are used, it is possible to combine the error propagated by the conventional error diffusion process with the error correction for subpixel manipulation, thereby reducing the need for additional hardware to implement the process. However, it is noted that the sum of the slowscan coefficients do not sum to unity, thus it is necessary to normalize the subpixel correction error so that the resultant error which passes to the pixels in the slowscan direction remains unchanged. For example, the subpixel error passed in the slowscan direction would be equal to the subpixel error divided by the sum of the slowscan coefficients.

With the error propagated in the slowscan direction in addition to the normal error produced by the error diffusion process, the aggregate number of black and white subpixels remain identical. In other words, the mean grey level is not altered by the present invention.

Figure 30:
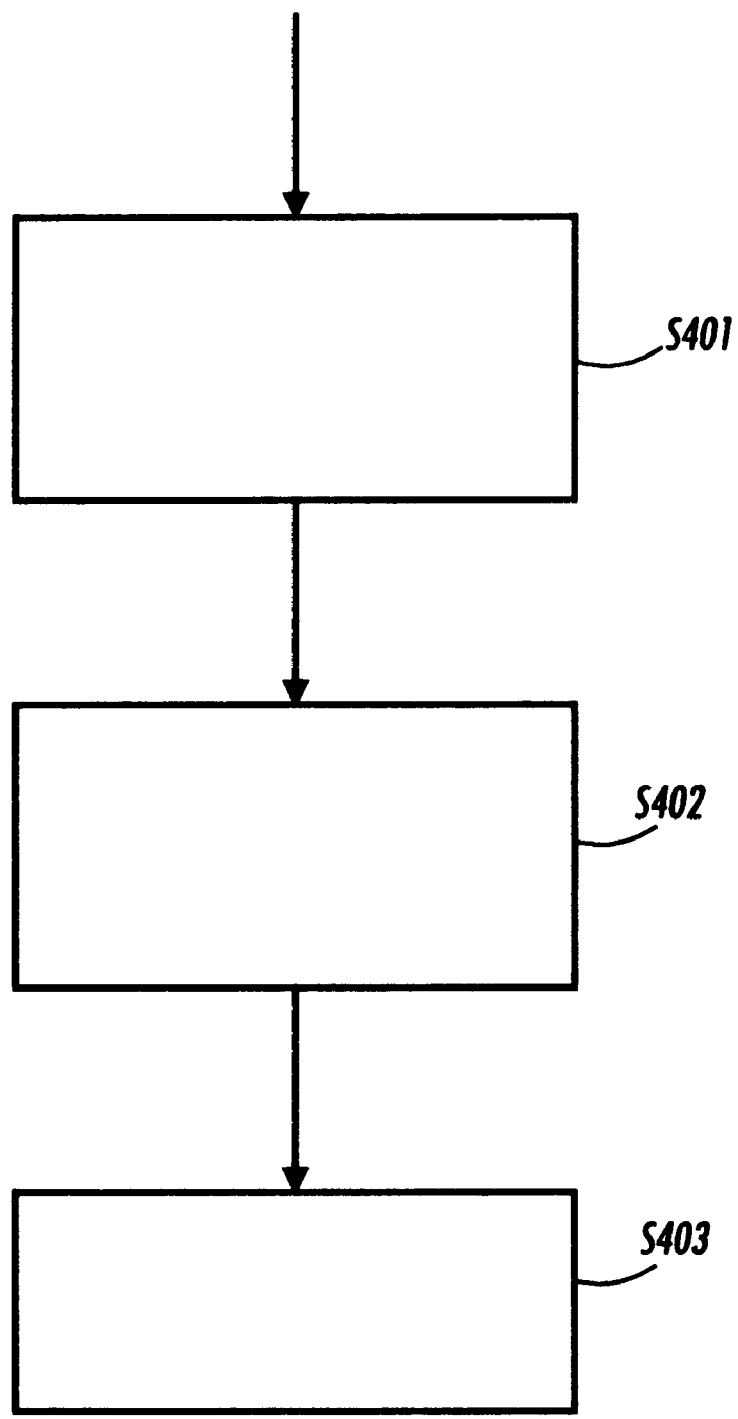
FIG. 30 shows a flowchart illustrating isolated subpixel elimination.

FIG. 30 illustrates a simple flowchart showing the isolated subpixel elimination process of the present invention. As shown in FIG. 30, Step S401 eliminates any isolated subpixel using the filtering (logic) described above, changes the binary output according to this elimination and determines the number of subpixels that were changed from white to black or black to white. Next Step S402 calculates the error resulting from the isolated subpixel elimination routine by multiplying the number of subpixels that were changed from white to black or black to white by the difference between a white subpixel value and a black subpixel value. Lastly, Step S403 diffuses the error to slowscan pixel positions in a FIFO buffer.

Figure 28:
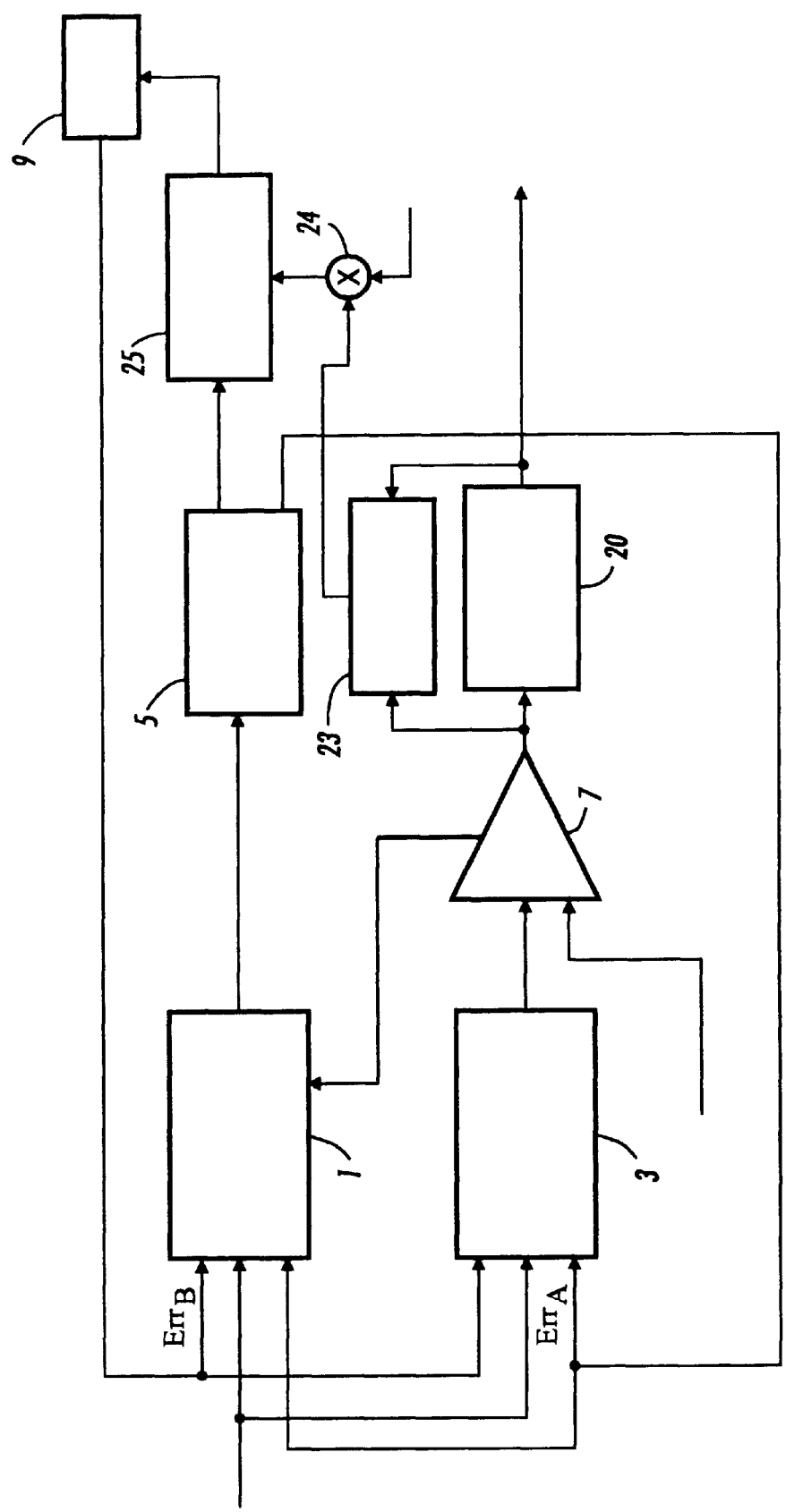
FIG. 28 shows a block diagram illustrating implementation of the isolated subpixel elimination circuit.

FIG. 28 illustrates a block diagram for carrying out the isolated subpixel elimination process according to one embodiment of the present invention. In FIG. 28, the input video signal is fed into an error calculation circuit 1 and a video modification circuit 3. The error components $e_{FIFO}$ (Err$_B$) and $e_{FB}$ (Err$_A$) are also fed into the error calculation circuit 1. The error calculation circuit calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ (Err$_B$) and $e_{FB}$ (Err$_A$). As noted before, the feedback error, Err$_A$, is fed back to the video modification circuit 3 and the error calculation circuit 1 from the coefficient matrix circuit 5. The video modification circuit 3 also receives the Err$_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data to be fed to single subpixel elimination circuit 20 and number of subpixel changes circuit 23. In the preferred embodiment of the present invention, the single subpixel elimination circuit 20 is the state machine illustrated in FIG. 27. The single subpixel elimination circuit 20 outputs the image data for utilization by an image rendering device and the number of subpixel changes circuit 23. The number of subpixel changes circuit 23 determines the number of subpixel state changes by comparing the image data fed into the single subpixel elimination circuit 20 and the image data generated by the single subpixel elimination circuit 20. This value is fed to multiplier 24 which multiplies the change numeric value with a difference value which is equal to a difference between a white subpixel value and a black subpixel value to produce a subpixel error value. The subpixel error value is fed to slowscan error adjustment circuit 25 along with the slowscan error from coefficient matrix circuit 5 which diffuses this slowscan errors to adjacent pixels via FIFO buffer 9 according to the process described above.

The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection. As illustrated in FIG. 20, the error calculation circuit 1 is in parallel with the video modification circuit 3 and the binarization circuit 7.

Figure 29:
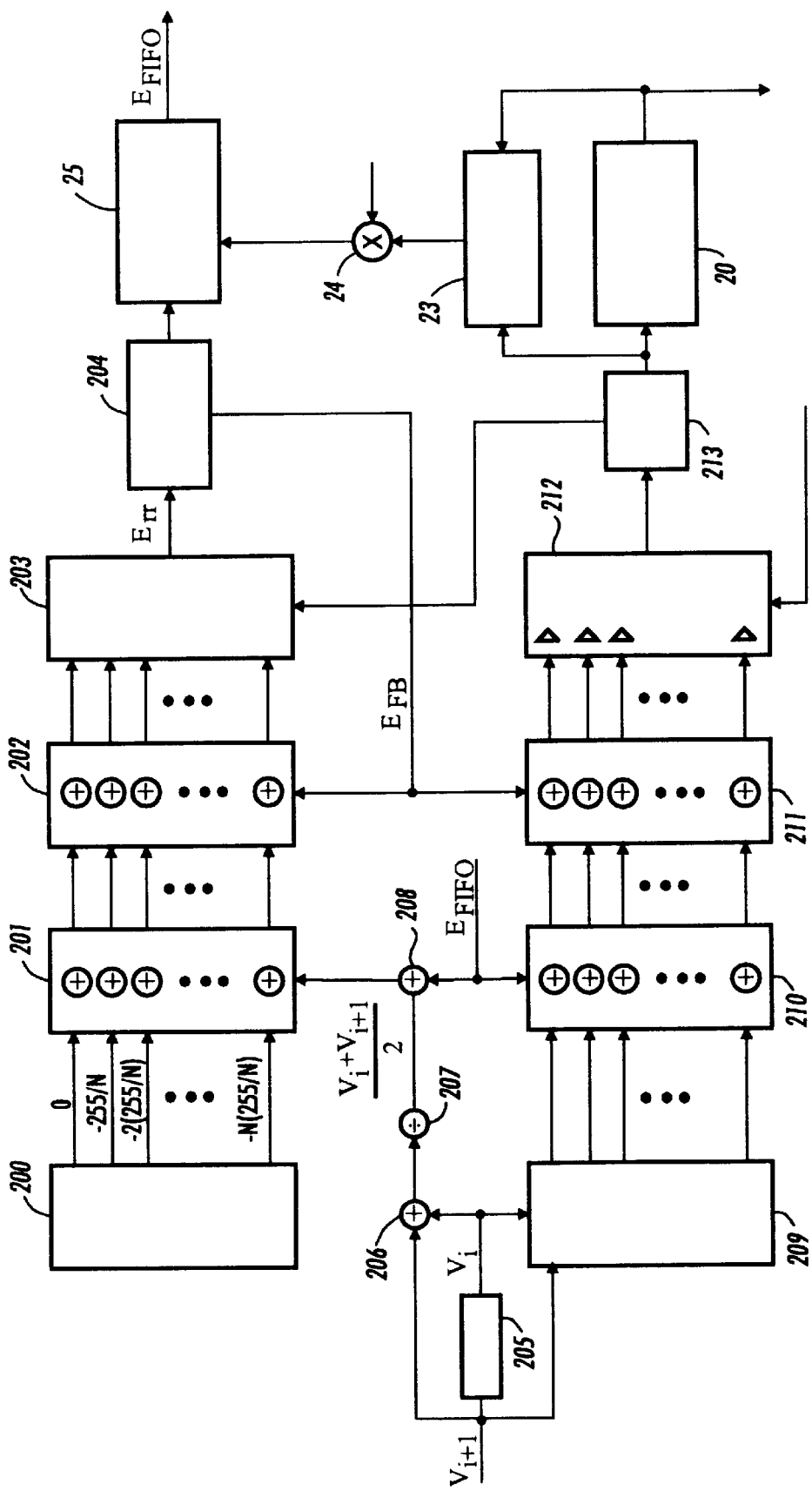
FIG. 29 shows a block diagram illustrating implementation of the isolated subpixel elimination circuit.

FIG. 29 illustrates a block diagram for carrying out the isolated subpixel elimination process according to another embodiment of the present invention. As illustrated in FIG. 29, pixel values $V_i$ and $V_{i+1}$ are obtained by the utilization of a latch 205 which latches the video signal so that two adjacent fastscan pixels are available for processing. The pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N possible actual outputs will be generated. Also in parallel to the above described process, a subpixel circuit generated all the interpolated subpixels based on the pixel values $V_i$ and $V_{i+1}$.

Next the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit 213 which produces a binary subpixel bit pattern therefrom to be fed to single subpixel elimination circuit 20 and number of subpixel changes circuit 23. In the preferred embodiment of the present invention, the single subpixel elimination circuit 20 is the state machine illustrated in FIG. 27.

The single subpixel elimination circuit 20 outputs the image data for utilization by an image rendering device and the number of subpixel changes circuit 23. The number of subpixel changes circuit 23 determines the number of subpixel state changes by comparing the image data fed into the single subpixel elimination circuit 20 and the image data generated by the single subpixel elimination circuit 20. This value is fed to multiplier 24 which multiplies the change numeric value with a difference value which is equal to a difference between a white subpixel value and a black subpixel value to produce a subpixel error value. The subpixel error value is fed to slowscan error adjustment circuit 25 along with the slowscan error from distribution circuit 204 which diffuses this slowscan errors to adjacent pixels via a FIFO buffer according to the process described above to be sent to a printer.

Moreover, the error terms from adder 202 are fed into a multiplexer 203 which chooses which error term to propagate to downstream pixels. The error term is selected based on a control signal received from the decode logic circuit 213. The selected error term is fed into distribution circuit 204 which produces the next feedback error and the error to be fed to slowscan error adjustment circuit 25 for forwarding to the FIFO buffer for utilization in the processing of the next scanline.

As mentioned above, in the single subpixel elimination process, the error propagated in the slow-scan direction of the image is updated to account for the altercation in the bitmap. This ensures that the percentage of black and white subpixels in a large area is not altered by the subpixel elimination and thus the percentages are the same with or without subpixel elimination only the distribution is changed.

Figure 32:
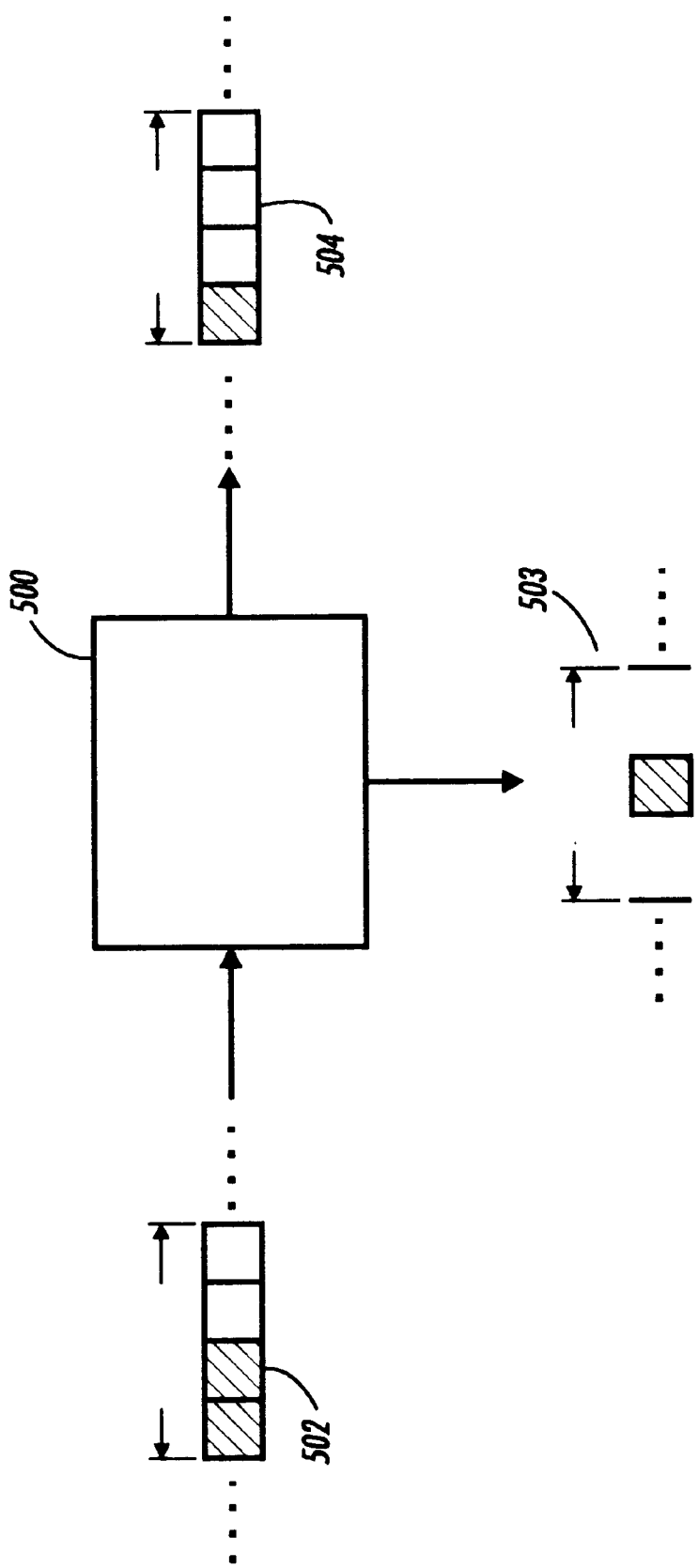
FIG. 32 is a block diagram showing a conventional subpixel elimination circuit.

For example, assume the output of standard high addressability error diffusion produced an output pixel that was comprised of two white subpixels and two black subpixels as illustrated in FIG. 32. After this output pixel 502 is processed by a subpixel elimination circuit 500, an output pixel 504 is generated which has three white subpixels and one black subpixel. The error generated by the subpixel elimination circuit 500 would be propagated in the slow-scan direction and would account for the fact that one white subpixel was added and one black subpixel was subtracted from the original output pixel 502. This error value would be represented by pixel 503. In other words, the value of the correction in the error propagated in the slow-scan direction is proportional to the number of subpixels that have changed state from the original output pixel 502 to the modified output pixel 504.

While this process of subpixel elimination substantially eliminates isolated subpixels, the subpixel elimination process tends to pass a lot of error in just the slow-scan direction due to the numerous altercations to the bitmap. In many instances, however, the bit manipulations are the combining of subpixels wherein white/black subpixels may simply be moved from one pixel to an adjacent pixel.

Figure 33:
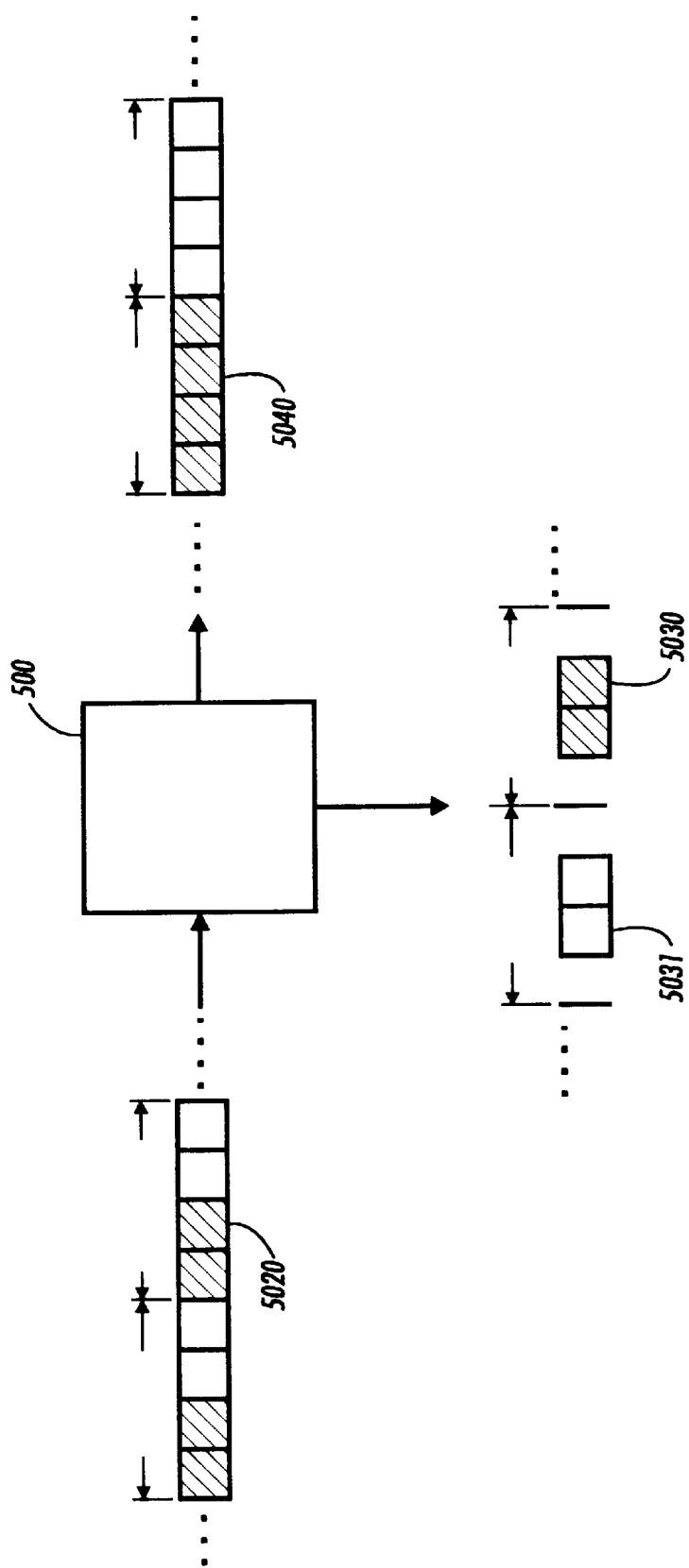
FIG. 33 is a block diagram showing a conventional subpixel elimination circuit and its effect on localized error.

As an example, consider two adjacent pixels before and after subpixel elimination as illustrated in FIG. 33. The group of first and second output pixels 5020 comprises of two black and two white subpixels each. After the group of two output pixels 5020 is processed by the subpixel elimination circuit 500, a second pixel of a group of output pixels 5040 is changed to all white subpixels (4 white subpixels) and a first pixel of the group of output pixels 5040 is changed to all black subpixels (4 black subpixels). In this instance, the two black subpixels from the second pixel of the group of pixels 5020 are moved to the first pixel of the group of pixels 5040, while the two white subpixels from the first pixel of the group of pixels 5020 are moved to the second pixel of the group of pixels 5040.

If the subpixel elimination process is considered for each individual output pixel, an error correction for the slow-scan would be associated with both the first pixel of the group of pixels 5020 and a second pixel of the group of pixels 5020. The error correction of the second pixel of the group of pixels 5020 would be equal in magnitude but opposite in polarity to that of the first pixel of the group of pixels 5020 within the group of pixels are considered as a pair, there are four white and four black subpixels in the group of pixels before and after the bit manipulation carried out by the subpixel elimination circuit 500, and thus, for this particular situation, no error correction in the slow-scan direction would be necessary. Therefore, it is desirable that this error produced from the subpixel elimination circuit be processed further in order to determine the local contribution as opposed to the error of each individual pixel. Such a process is illustrated in FIG. 34.

Figure 34:
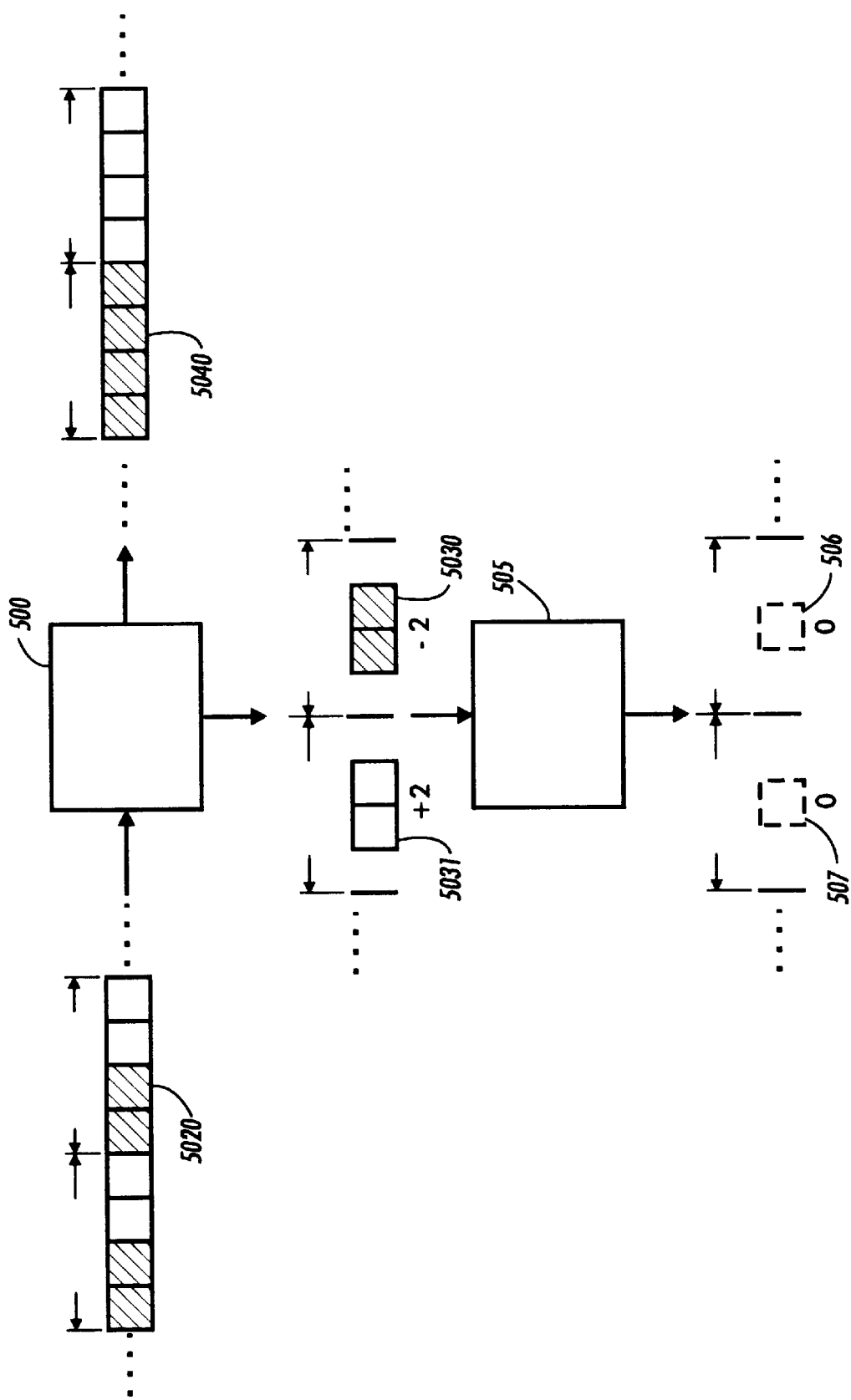
FIG. 34 is a block diagram showing a subpixel elimination circuit with localized error correction according to the concepts of the present invention.

As illustrated in FIG. 34, the error generated from the subpixel elimination circuit 500 is fed to a error localization circuit 505 which processes the error from two adjacent pixels to produce a localized error to be propagated in the slow-scan direction. In the example discussed above, error pixels 5031 and 5030 are fed to the error localization circuit to produce error pixels 507 and 506. It is noted that the error pixels 507 and 506 are both 0 since relative error between the two adjacent pixels is 0(+2, −2).

Figure 35:
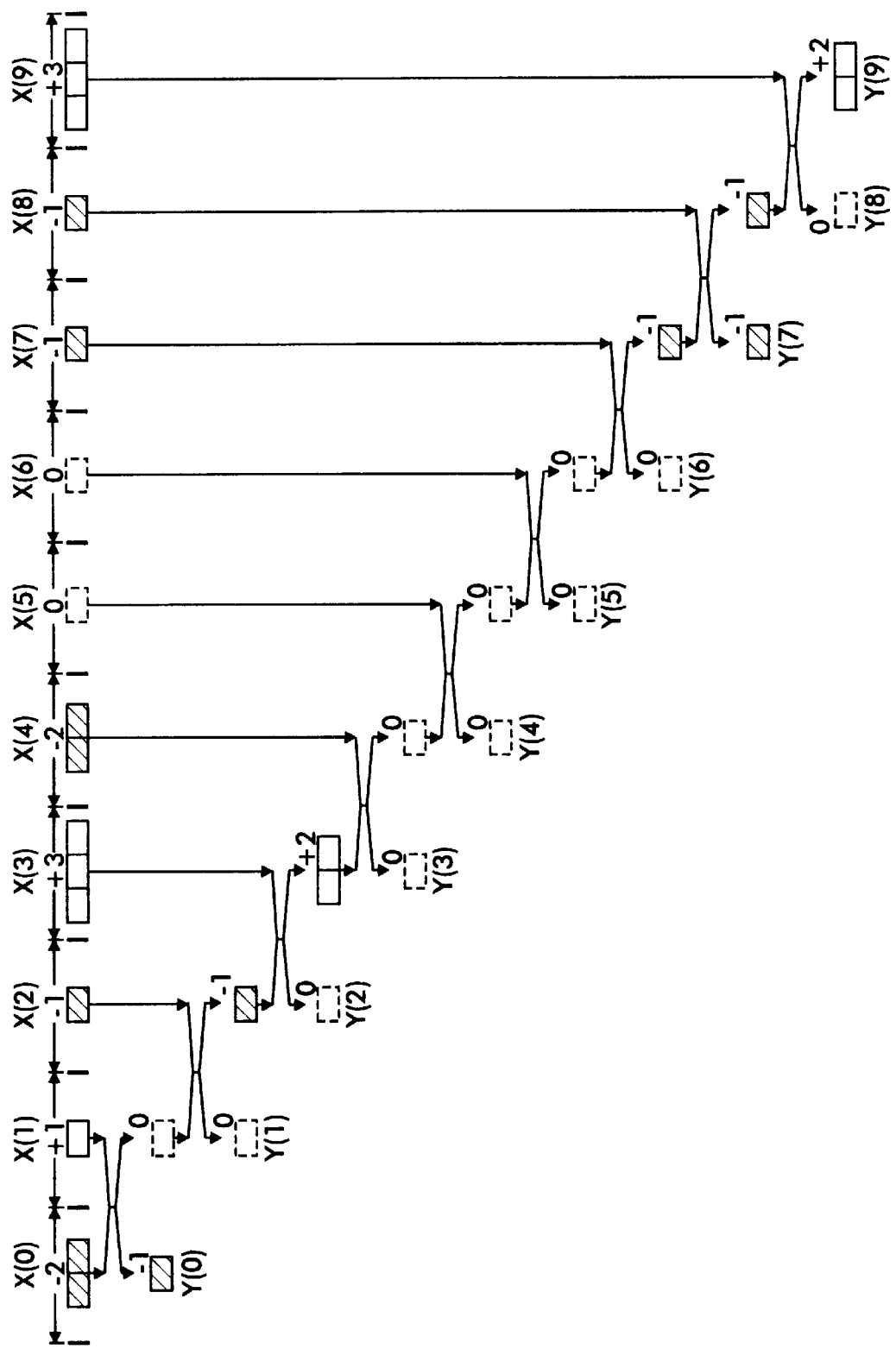
FIG. 35 is a graphical representation of subpixel elimination with localized correction according to the concepts of the present invention.

FIG. 35 is a flowchart illustrating the overall process of localized error corrections for a subpixel elimination process. As illustrated in FIG. 35, the slow-scan error correction updates due to bit manipulations by the subpixel elimination circuit are stored in a vector X, where X(n) represents the error correction associated with the nth pixel. The value of X(n) can be positive or negative wherein one polarity represents subpixels that were shifted from white to black and the other polarity represents the opposite shift of black to white. A value of 0 represents that there was no change in the number of black/white subpixels.

Moreover, FIG. 35 illustrates that a new set of update values, Y, are created using the logical pairing of the X(n)s. After this pairing, the new set of update values (Y) have the same sum as X, ($\Sigma Y(n) = \Sigma X(n)$), but a smaller absolute value than X, ($\Sigma |Y(n)| <= |X(n)|$). In other words, on average, the needed updates to account for bit manipulations will be correct, but the power in the error corrections will be smaller due to a smaller variance. The process used to pair X for creating Y is as follows. Initially, Y(n+1) is a set equal to X(n+1). The values Y(n) and Y(n+1) are then treated as a pair to determine the overall error as described above. If Y(n) and Y(n+1) are the same sign or one of the values is 0, both values are left unchanged. However, if Y(n) and Y(n+1) are of different signs, the one that has the smaller absolute value of the two is assigned a value of 0 while the other is assigned the sum of the two original values. The value of Y(n) is then used to determine the slow-scan error correction due to bit manipulations. This can be more clearly seen utilizing the example illustrated in FIG. 35.

As illustrated in FIG. 35, the example assumes that the slow-scan error correction needed for each pixel due to subpixel elimination is determined to be X={−2, 1, −1, 3, −2, 0, 0, −1, 3}.

Determining the values of Y(n), step by step is shown in the following table:

| Y Values | Description |
| --- | --- |
| y(0) = x(0) = −2 | Initialize (0) |
| y(0) = −2, y(1) = x(1) = 1 | Since y(0) and y(1) are opposite sign, y(0) = −1, (1) = 0 |
| y(1) = 0, y(2) = x(2) = −1 | Since y(1) is zero, y(1) and y(2) are left unchanged, y(1) = 0, (2) = −1 |
| y(2) = −1 y(3) = x(3) = 3 | Since y(2) and y(3) are opposite sign, y(2) = 0, y(3) = 2 |
| y(3) = 2 y(4) = −2 | Since y(3) and y(4) are opposite sign, y(3) = 0, y(4) = 0 |
| y(4) = 0, y(5) = 0 | |
| y(5) = 0, y(6) = 0 | |
| y(6) = 0, y(7) = −1 | Since y(6) is zero, y(6) and y(7) are left unchanged, y(6) = 0, y(7) = −1 |

-continued

| Y Values | Description |
| --- | --- |
| y(7) = −1, y(8) = −1 | Since y(7) and y(8) are the same sign, both are left unchanged, y(7) = −1, y(8) = −1 |
| y(8) = −1, y(9) = 3 y(8) = 0, y(9) = 2 | Since y(8) and y(9) are opposite sign, |

Figure 36:
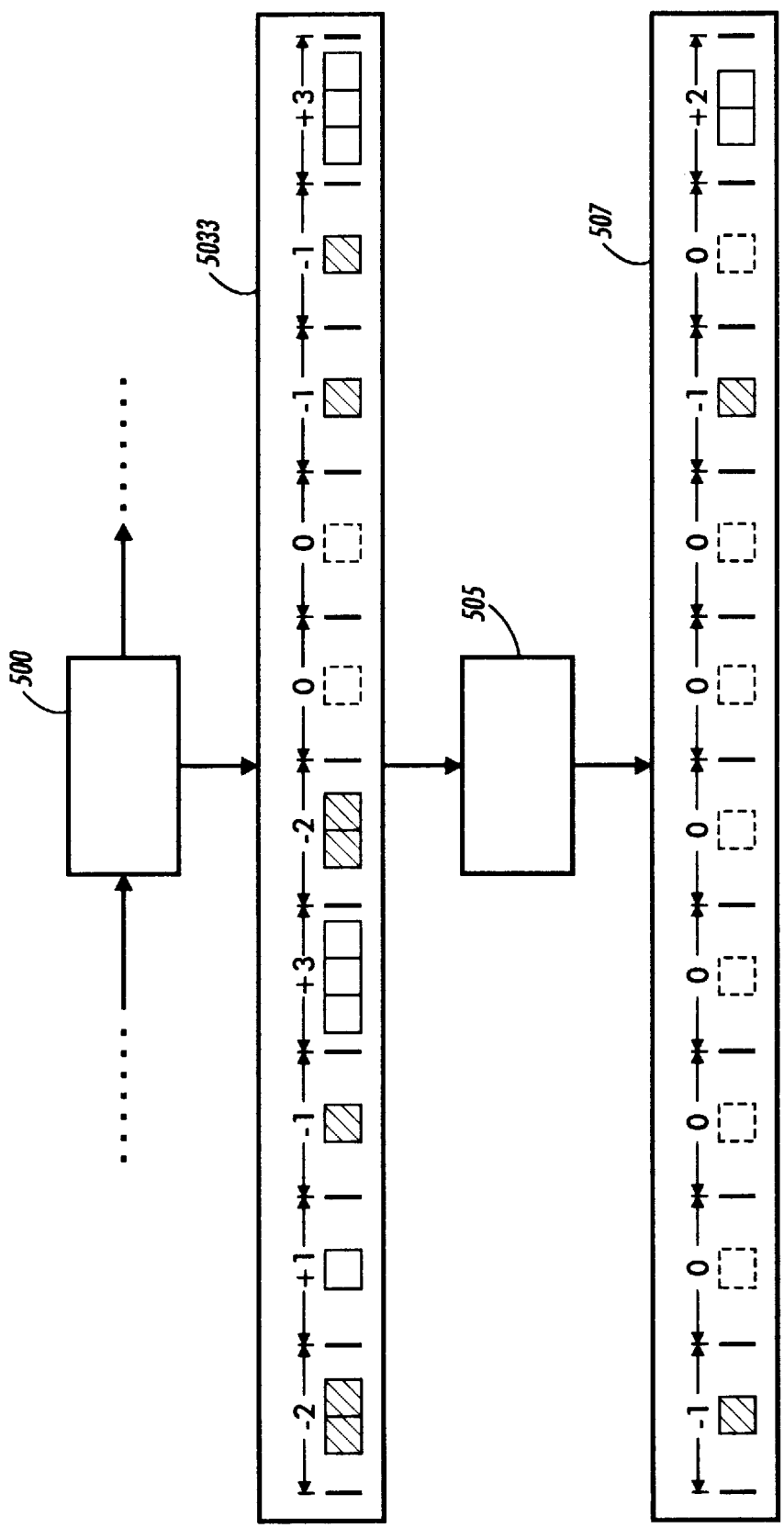
FIG. 36 is a block diagram showing an example of subpixel elimination with localized error correction according to the concepts of the present invention.

The output vector with the new slow-scan error correction needed for each pixel is Y={−1, 0, 0, 0, 0, 0, 0, −1, 0, 2} as shown in the block diagram of FIG. 36.

FIG. 36 is a block diagram illustrating the example shown in FIG. 35. More specifically, the subpixel elimination circuit 500 receives the inputted video signal or plurality of pixels and outputs modified pixel bit patterns so as to eliminate the isolated subpixels. From this subpixel elimination process, the slow-scan error correction needed for each pixel due to subpixel elimination X(5033) is generated by the subpixel elimination circuit 500. This vector of error values is fed to the error localization circuit 505 which produces the output vector with the new slow-scan error correction needed for each pixel Y(507).

Figure 37:
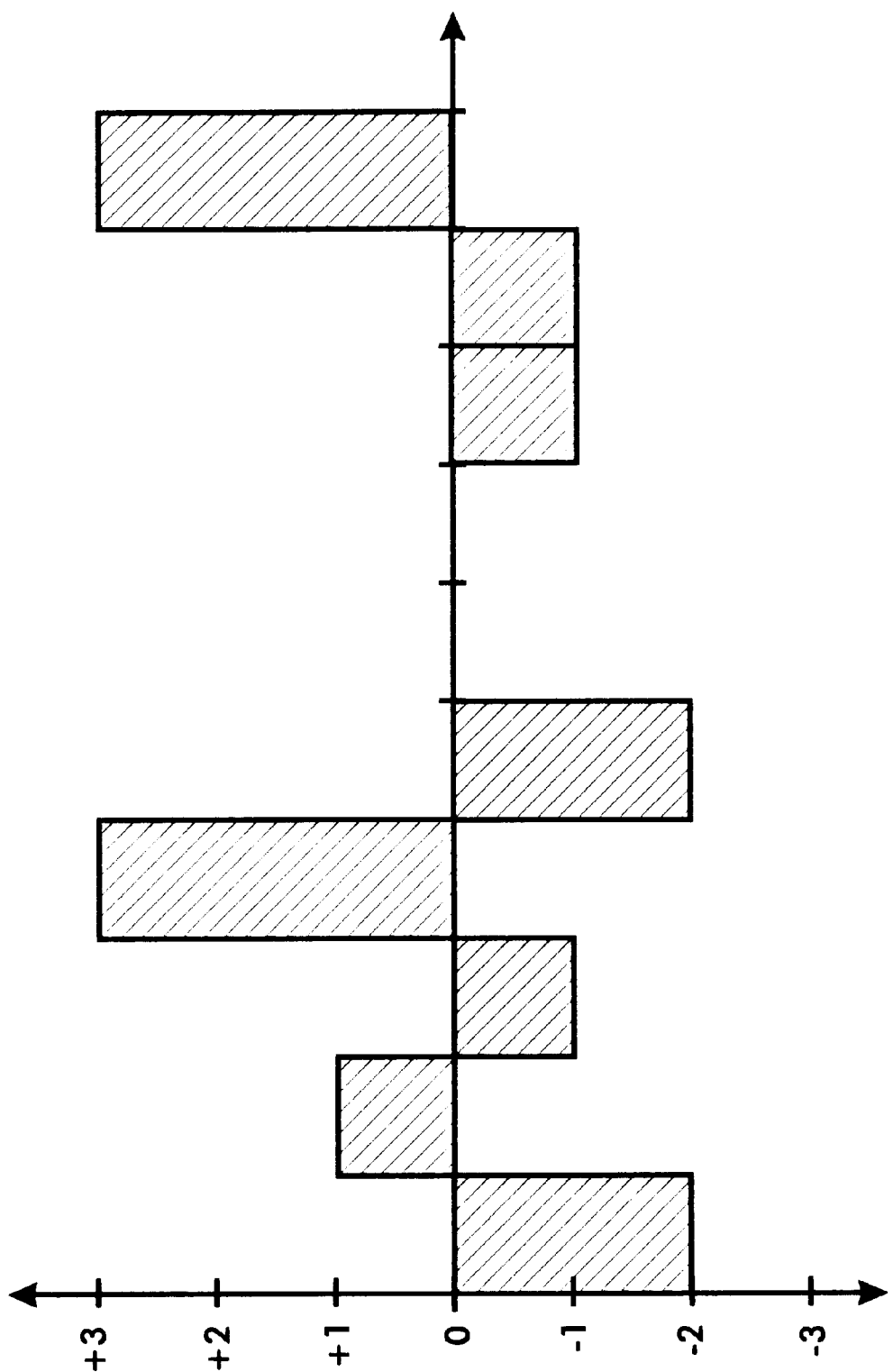
FIG. 37 is a graph showing subpixel elimination.
Figure 38:
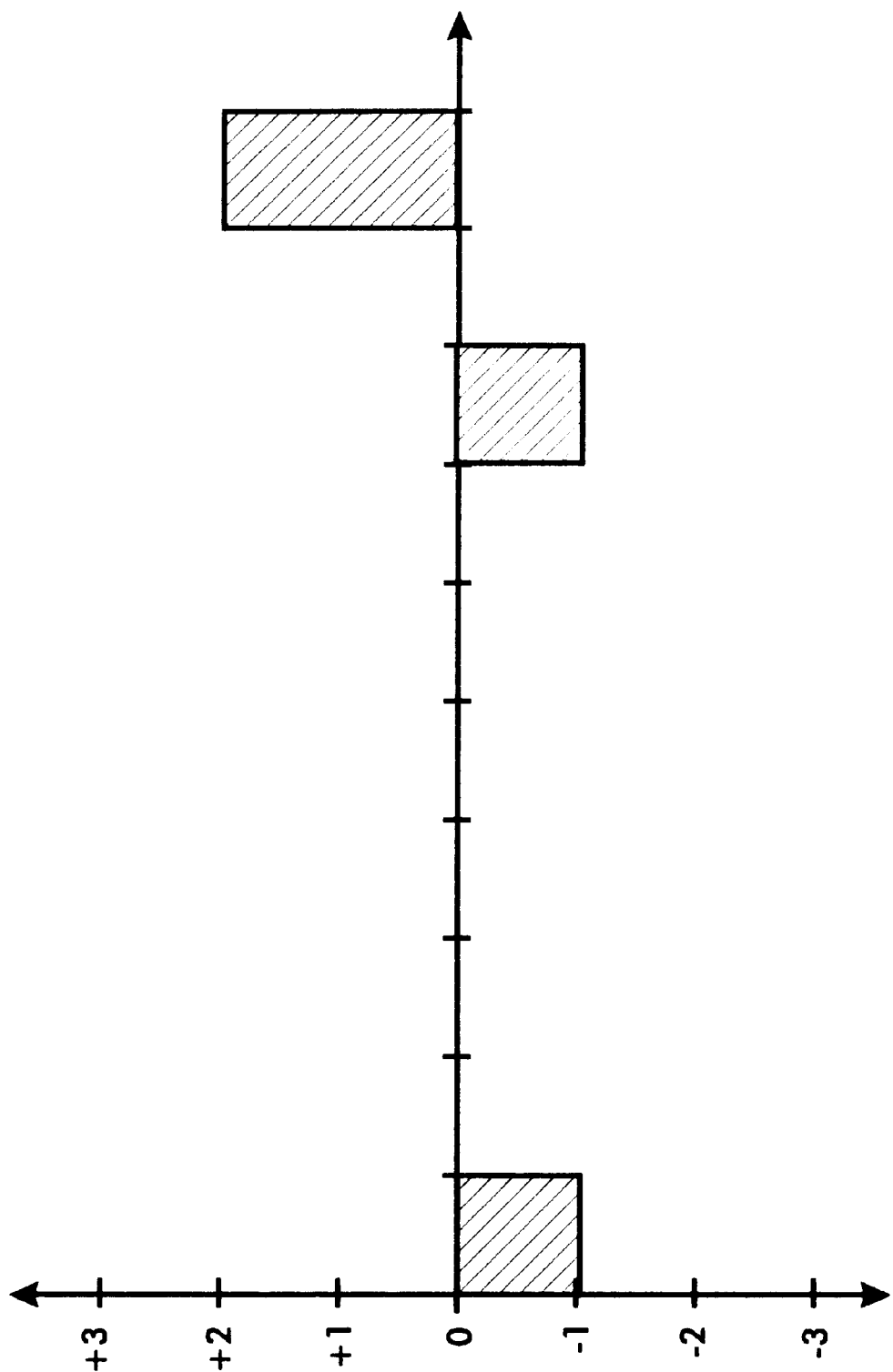
FIG. 38 is a graph showing subpixel elimination with localized error correction.

The error profile before and after error localization is shown in FIGS. 37 and 38, respectively. It is noted that X and Y both sum to 0 (the aggregate correction has not changed), but the signal level in Y (it's variance) is much smaller than X.

Although the described present invention considers two adjacent fast-scan pixel error values, one can extend the concepts of the present invention to calculate the local error over a larger area of pixels in order to further limit the magnitude of error that is propagated downstream. For example, the process may include three or four adjacent fast-scan pixels along with a slow-scan pixel error count for calculating the error (considering any slow-scan error would, however, require external storage). This process may also be combined with error redistribution as described in allowed U.S. patent application Ser. No. 08/285,265 where the error can be clipped to sum predetermined values, for example, and redistributed in the subsequent fast-scan error calculation, thus limiting the magnitude of the error to be propagated in the slow-scan direction. The entire contents of U.S. patent application Ser. No. 08/285,265 are hereby incorporated by reference.

Although the present invention has been described in detail above, various modifications can be implemented without departing from the spirit of the present invention. For example, the preferred embodiment of the present invention has been described with respect to a printing system; however, this error diffusion method is readily implemented in a display system. Moreover, the high addressability error diffusion method of the present invention can be readily implemented on an ASIC, programmable gate array, or in software, thereby enabling the placement of this process in a scanner, electronic subsystem, printer, or display device.

Moreover, various examples of the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level output terminal or higher.

Lastly, the present invention has been described with respect to a monochrome or black/white environment. However, the concepts of the present invention are readily applicable to a color environment. Namely, the high addressability error diffusion process of the present invention can be applied to each color space value representing the color pixel.

In recapitulation, the present invention provides a combined isolated subpixel elimination process with local error compensation and a high addressable error diffusion method or module which enables an image processing system to convert an electronic document of one format to that of another format.

While the present invention has been described with reference to various embodiments disclosed herein before, it is not to be confined to the detail set forth above, but is intended to cover such modifications or changes as made within the scope of the attached claims.

What is claimed is:

1. A method for processing image data, comprising the steps of:
    (a) receiving a plurality of pixels of image data;
    (b) converting the received pixels of image data to a bitmap of image data ready for rendering on an output device;
    (c) analyzing the bitmap for a predetermined characteristic;
    (d) modifying the image data within the bitmap when the predetermined characteristic is detected;
    (e) generating an error based on the modification performed in said step (d);
    (f) determining if other image data within the bitmap needs modification based on the generated error using a method including:
        (f1) comparing adjacent error values; and
        (f2) assigning the error value that has the smaller absolute value to a value of zero and the other error value to a value equal to a sum of the two original error values when the two compared adjacent error values are of different polarity; and
    (g) further modifying the bitmap if said step (f) makes a positive determination.

2. The method as claimed in claim 1, wherein said step (g) modifies pixels within the bitmap which are in a slowscan direction from the original pixel being modified in said step (d).

3. The method as claimed in claim 1, wherein the predetermined characteristic is an isolated pixel.

4. The method as claimed in claim 1, wherein the predetermined characteristic is an undesirable pattern which contains a pixel from a CMY space and a same pixel from a K space which are both characterized as being ON.

5. A system for processing image data, comprising:
    means for converting received pixels of image data to a bitmap of image data ready for rendering on an output device;
    comparing means for analyzing the bitmap for a predetermined characteristic;
    compensation means for modifying the image data within the bitmap when the predetermined characteristic is detected;
    error means for generating an error based on the modification performed by said compensation means; and
    local error means for determining if other image data within the bitmap needs modification based on the generated error and for further modifying the bitmap if the other image data within the bitmap needs modification based on the generated error, wherein said local error means compares adjacent error values and assigns the error value that has the smaller absolute value to a value of zero and the other error value to a value equal to a sum of the two original error values when the two compared adjacent error values are of different polarity.

6. The system as claimed in claim 5, wherein said local error means modifies pixels within the bitmap which are in a slowscan direction from the original pixel being modified by said compensation means.

7. The system as claimed in claim 5, wherein the predetermined characteristic is an isolated pixel.

8. The system as claimed in claim 5, wherein the predetermined characteristic is an undesirable pattern which contains a pixel from a CMY space and a same pixel from a K space which are both characterized as being ON.

9. A method for processing image data, comprising the steps of:
    (a) receiving a plurality of pixels of image data;
    (b) converting the received pixels of image data to a bitmap of image data ready for rendering on an output device;
    (c) analyzing the bitmap for a predetermined characteristic, wherein the predetermined characteristic is an undesirable pattern which contains a pixel from a CMY space and a same pixel from a K space which are both characterized as being ON;
    (d) modifying the image data within the bitmap when the predetermined characteristic is detected;
    (e) generating an error based on the modification performed in said step (d);
    (f) determining if other image data within the bitmap needs modification based on the generated error; and
    (g) further modifying the bitmap if said step (f) makes a positive determination.

10. A method for processing image data, comprising the steps of:
    (a) receiving a plurality of pixels of image data;
    (b) converting the received pixels of image data to a bitmap of image data ready for rendering on an output device;
    (c) analyzing the bitmap for a predetermined characteristic, wherein the predetermined characteristic is an undesirable pattern which contains a pixel from a CMY space and a same pixel from a K space which are both characterized as being ON;
    (d) modifying the image data within the bitmap when the predetermined characteristic is detected;
    (e) generating an error based on the modification performed in said step (d);
    (f) determining if other image data within the bitmap needs modification based on the generated error; and
    (g) further modifying the bitmap if said step (f) makes a positive determination.

* * * * *